(12) United States Patent
McCready

(10) Patent No.: US 9,541,471 B2
(45) Date of Patent: Jan. 10, 2017

(54) MULTIVARIATE PREDICTION OF A BATCH MANUFACTURING PROCESS

(71) Applicant: MKS Instruments, Inc., Andover, MA (US)

(72) Inventor: Chris Peter McCready, London (CA)

(73) Assignee: MKS Instruments, Inc., Andover, MA (US)

( * ) Notice: Subject to any disclaimer, the term of this patent is extended or adjusted under 35 U.S.C. 154(b) by 481 days.

(21) Appl. No.: 14/158,914

(22) Filed: Jan. 20, 2014

(65) Prior Publication Data

US 2014/0136146 A1 May 15, 2014

Related U.S. Application Data

(63) Continuation-in-part of application No. 13/441,513, filed on Apr. 6, 2012, now Pat. No. 9,429,939.

(51) Int. Cl.
*G05B 23/02* (2006.01)
*G01M 99/00* (2011.01)

(52) U.S. Cl.
CPC ............ *G01M 99/00* (2013.01); *G05B 23/024* (2013.01); *G05B 23/0254* (2013.01)

(58) Field of Classification Search
CPC .................................................. G05B 23/0254
USPC ........................................................ 702/179
See application file for complete search history.

(56) References Cited

U.S. PATENT DOCUMENTS

| | | |
|---|---|---|
| 5,135,688 A | 8/1992 | Nakamura et al. |
| 5,149,472 A | 9/1992 | Suganuma |
| 5,173,224 A | 12/1992 | Nakamura et al. |
| 5,347,446 A | 9/1994 | Iino et al. |
| 5,403,433 A | 4/1995 | Morrison et al. |
| 5,408,405 A | 4/1995 | Mozumder et al. |
| 5,442,562 A | 8/1995 | Hopkins et al. |
| 5,469,361 A | 11/1995 | Moyne |
| 5,479,340 A | 12/1995 | Fox et al. |
| 5,544,256 A | 8/1996 | Brecher et al. |
| 5,587,792 A | 12/1996 | Nishizawa et al. |
| 5,710,700 A | 1/1998 | Kurtzberg et al. |
| 5,786,999 A | 7/1998 | Spahr et al. |
| 5,815,397 A | 9/1998 | Saito et al. |
| 5,885,624 A | 3/1999 | Katsuta et al. |
| 5,900,633 A | 5/1999 | Solomon et al. |

(Continued)

FOREIGN PATENT DOCUMENTS

| | | |
|---|---|---|
| DE | 101 14 211 A1 | 11/2001 |
| DE | 100 40 731 A1 | 3/2002 |

(Continued)

OTHER PUBLICATIONS

Singapore Written Opinion and Search Report for Application No. 201105312-1, mailed on Sep. 14, 2012 (20 pgs.).

(Continued)

*Primary Examiner* — Bryan Bui

(74) *Attorney, Agent, or Firm* — Proskauer Rose LLP

(57) ABSTRACT

A method and system for predicting prospective behavior of a manufacturing process are described. Measured values of multiple variables, including at least one dependent variable, are received. A partial least squares (PLS) regression approach is used to estimate an unknown future value of the at least one dependent variable at a future point in time in a current batch run.

20 Claims, 14 Drawing Sheets

(56) References Cited

U.S. PATENT DOCUMENTS

| | | |
|---|---|---|
| 5,949,678 A | 9/1999 | Wold et al. |
| 5,993,704 A | 11/1999 | Bader |
| 5,997,778 A | 12/1999 | Bulgrin |
| 6,090,318 A | 7/2000 | Bader et al. |
| 6,153,115 A | 11/2000 | Le et al. |
| 6,336,082 B1 | 1/2002 | Nguyen et al. |
| 6,354,145 B1 | 3/2002 | Fransson et al. |
| 6,368,883 B1 | 4/2002 | Bode et al. |
| 6,442,445 B1 | 8/2002 | Bunkofske et al. |
| 6,453,246 B1 | 9/2002 | Agrafiotis et al. |
| 6,456,899 B1 | 9/2002 | Gleason et al. |
| 6,528,331 B1 | 3/2003 | Bode et al. |
| 6,556,884 B1 | 4/2003 | Miller et al. |
| 6,564,119 B1 | 5/2003 | Vaculik et al. |
| 6,584,368 B2 | 6/2003 | Bunkofske et al. |
| 6,594,620 B1 | 7/2003 | Qin et al. |
| 6,607,577 B2 | 8/2003 | Vaculik et al. |
| 6,678,569 B2 | 1/2004 | Bunkofske et al. |
| 6,682,669 B2 | 1/2004 | Bulgrin et al. |
| 6,687,558 B2 | 2/2004 | Tuszynski |
| 6,718,224 B2 | 4/2004 | Firth et al. |
| 6,721,616 B1 | 4/2004 | Ryskoski |
| 6,741,903 B1 | 5/2004 | Bode et al. |
| 6,801,831 B2 | 10/2004 | Sasaki |
| 6,830,939 B2 | 12/2004 | Harvey et al. |
| 6,839,655 B2 | 1/2005 | Gross et al. |
| 6,876,931 B2 | 4/2005 | Lorenz et al. |
| 6,917,839 B2 | 7/2005 | Bickford |
| 6,967,899 B1 | 11/2005 | O'Brien, Jr. et al. |
| 6,968,253 B2 | 11/2005 | Mack et al. |
| 6,975,944 B1 | 12/2005 | Zenhausern |
| 6,983,176 B2 | 1/2006 | Gardner et al. |
| 7,003,490 B1 | 2/2006 | Keyes |
| 7,031,800 B2 | 4/2006 | Bulgrin |
| 7,043,401 B2 | 5/2006 | Taguchi et al. |
| 7,062,417 B2 | 6/2006 | Kruger et al. |
| 7,072,794 B2 | 7/2006 | Wittkowski |
| 7,107,491 B2 | 9/2006 | Graichen et al. |
| 7,151,976 B2 | 12/2006 | Lin |
| 7,189,964 B2 | 3/2007 | Castro-Perez et al. |
| 7,191,106 B2 | 3/2007 | Minor et al. |
| 7,198,964 B1 | 4/2007 | Cherry et al. |
| 7,216,005 B2 | 5/2007 | Shioiri et al. |
| 7,313,454 B2 | 12/2007 | Hendler et al. |
| 7,328,126 B2 | 2/2008 | Chamness |
| 7,433,743 B2 | 10/2008 | Pistikopoulos et al. |
| 7,465,417 B2 | 12/2008 | Hutson et al. |
| 7,597,827 B2 | 10/2009 | Frey |
| 7,622,308 B2 | 11/2009 | Hendler et al. |
| 7,840,297 B1 | 11/2010 | Tuszynski |
| 8,135,481 B2 | 3/2012 | Blevins et al. |
| 8,271,103 B2 | 9/2012 | Hendler et al. |
| 8,360,040 B2 | 1/2013 | Stewart et al. |
| 9,069,345 B2 * | 6/2015 | McCready ........... G05B 13/048 |
| 2002/0019672 A1 | 2/2002 | Paunonen |
| 2002/0038926 A1 | 4/2002 | Vaculik et al. |
| 2002/0107858 A1 | 8/2002 | Lundahl et al. |
| 2002/0143472 A1 | 10/2002 | Mutter |
| 2003/0011376 A1 | 1/2003 | Matsushita et al. |
| 2003/0033040 A1 | 2/2003 | Billings |
| 2003/0065462 A1 | 4/2003 | Potyrailo |
| 2003/0182281 A1 | 9/2003 | Wittkowski |
| 2004/0049295 A1 | 3/2004 | Wojsznis et al. |
| 2004/0055888 A1 | 3/2004 | Wikiel et al. |
| 2004/0064259 A1 | 4/2004 | Haaland et al. |
| 2004/0064357 A1 | 4/2004 | Hunter et al. |
| 2004/0083065 A1 | 4/2004 | Daniel et al. |
| 2004/0116814 A1 | 6/2004 | Stranc et al. |
| 2004/0122859 A1 | 6/2004 | Gavra et al. |
| 2004/0153815 A1 | 8/2004 | Volponi |
| 2004/0186603 A1 | 9/2004 | Sanford et al. |
| 2004/0204775 A1 | 10/2004 | Keyes et al. |
| 2004/0215424 A1 | 10/2004 | Taguchi et al. |
| 2004/0225377 A1 | 11/2004 | Kokotov et al. |
| 2004/0228186 A1 | 11/2004 | Kadota |
| 2004/0254762 A1 | 12/2004 | Hopkins et al. |
| 2004/0259276 A1 | 12/2004 | Yue et al. |
| 2005/0010318 A1 | 1/2005 | Lev-Ami et al. |
| 2005/0028932 A1 | 2/2005 | Shekel et al. |
| 2005/0037515 A1 | 2/2005 | Nicholson et al. |
| 2005/0043902 A1 | 2/2005 | Haaland et al. |
| 2005/0045821 A1 | 3/2005 | Noji et al. |
| 2005/0060103 A1 | 3/2005 | Chamness |
| 2005/0130321 A1 | 6/2005 | Nicholson et al. |
| 2005/0251276 A1 | 11/2005 | Shen |
| 2005/0268197 A1 | 12/2005 | Wold |
| 2006/0012064 A1 | 1/2006 | Hutson et al. |
| 2006/0039598 A1 | 2/2006 | Kim et al. |
| 2006/0058898 A1 | 3/2006 | Emigholz et al. |
| 2006/0111804 A1 | 5/2006 | Lin |
| 2006/0122807 A1 | 6/2006 | Wittkowski |
| 2006/0149407 A1 | 7/2006 | Markham et al. |
| 2006/0155410 A1 | 7/2006 | Yamartino |
| 2006/0184264 A1 | 8/2006 | Willis et al. |
| 2006/0259163 A1 | 11/2006 | Hsiung et al. |
| 2007/0021859 A1 | 1/2007 | Lev-Ami et al. |
| 2007/0100475 A1 | 5/2007 | Korchinski |
| 2008/0010531 A1 | 1/2008 | Hendler et al. |
| 2008/0015814 A1 | 1/2008 | Harvey, Jr. et al. |
| 2008/0082181 A1 | 4/2008 | Miller et al. |
| 2008/0082194 A1 | 4/2008 | Samardzija et al. |
| 2008/0082195 A1 | 4/2008 | Samardzija |
| 2008/0104003 A1 | 5/2008 | Macharia et al. |
| 2008/0125898 A1 | 5/2008 | Harvey et al. |
| 2008/0183311 A1 | 7/2008 | MacArthur et al. |
| 2008/0221720 A1 | 9/2008 | Hendler et al. |
| 2008/0262795 A1 | 10/2008 | Webb et al. |
| 2008/0275587 A1 | 11/2008 | Adams |
| 2009/0037013 A1 | 2/2009 | Hendler et al. |
| 2009/0055140 A1 | 2/2009 | Kettaneh et al. |
| 2009/0164171 A1 | 6/2009 | Wold et al. |
| 2009/0210081 A1 | 8/2009 | Sustaeta et al. |
| 2009/0228247 A1 | 9/2009 | Hendler et al. |
| 2009/0287320 A1 | 11/2009 | MacGregor et al. |
| 2009/0312851 A1 | 12/2009 | Mishra |
| 2010/0057237 A1 | 3/2010 | Kettaneh et al. |
| 2010/0082120 A1 | 4/2010 | Stephenson et al. |
| 2010/0191361 A1 | 7/2010 | McCready et al. |
| 2011/0276169 A1 | 11/2011 | Bourg, Jr. et al. |
| 2012/0239167 A1 | 9/2012 | Carrette |

FOREIGN PATENT DOCUMENTS

| | | |
|---|---|---|
| EP | 0 524 317 A1 | 1/1993 |
| EP | 0737560 | 10/1996 |
| GB | 2394312 A | 4/2004 |
| GB | 2441640 A | 3/2008 |
| JP | 02-120019 | 5/1990 |
| JP | H04-266101 | 9/1992 |
| JP | 08-118443 | 5/1996 |
| WO | 03/085504 | 10/2003 |
| WO | 03/103024 | 12/2003 |
| WO | 2004/019147 | 3/2004 |
| WO | 2004/046835 | 6/2004 |
| WO | 2005114338 | 12/2005 |
| WO | 2006019448 | 2/2006 |
| WO | 2007/046945 A2 | 4/2007 |
| WO | 2009151419 | 12/2009 |
| WO | 2010085479 | 7/2010 |
| WO | 2012067727 | 5/2012 |

OTHER PUBLICATIONS

Ahmed S. F., "A New Approach in Industrial Automation Application Embedded System Design for Injection Molding Machine," IEEE Xplore, Oct. 29, 2009, 5 pages.

Bai, et al., "IMPOS: A Method and System for Injection Molding Optimization," IEEE Xplore, Oct. 29, 2009, 5 pages.

C. E. Castro, et al., "Multiple criteria optimization with variability considerations in injection molding," Polymer Engineering and Science, vol. 47, p. 400, 2007.

(56) References Cited

OTHER PUBLICATIONS

C. M. Seaman, et al., "Multi-objective optimization of a plastic injection molding process," IEEE Transactions on Control Systems Technology, vol. 2, No. 3, pp. 157-168, 1994.

Chen, et al., "Application of Advanced Process Control in Plastic Injection Molding," IEEE Xplore, Oct. 29, 2009, 6 pages.

Chen, et al., "Injection Molding Quality Control by Integrating Weight Feedback into a Cascade Closed-Loop Control System," Polymer Engineering and Science, 2007, 11 pages.

International Search Report for International Application No. PCT/US2010/021486, Date of Mailing Jul. 5, 2010 (20 pages total).

D. Kazmer and C. Roser, "Evaluation of Product and Process Design Robustness," Research in Engineering Design, vol. 11, pp. 20-30, 1999.

D. Kazmer, "Chapter 13: Quality Control," in Plastics Manufacturing Systems Engineering, ed Munich: Carl Hanser Verlag, 2009, pp. 387-418.

D. Kazmer and S. Westerdale, "A model-based methodology for on-line quality control," Int. J. Adv. Manuf. Tech vol, vol. 42, pp. 280-292, 2009.

D. O. Kazmer, et al., "A Comparison of Statistical Process Control (SPC) and On-Line Multivariate Analyses (MVA) for Injection Molding," International Polymer Processing, vol. 23, pp. 447-458, 2008.

Dubay, et al., "An Investigation on the Application of Predictive Control for Controlling Screw Position and Velocity on an Injection Molding Machine," Polymer Engineering and Science, 2007, 10 pages.

Fung, et al., "Application of a Capacitive Transducer for Online Part Weight Prediction and Fault Detection in Injection Molding," Polymer Engineering and Science, 2007, 7 pages.

G. Sherbelis, et al., "The Methods and benefits of Establishing a Process Window," in Proceedings of the 55th Annual Technical Conference, ANTEC, Part 1 (of3), 1997, pp. 545-550.

J. W. Mann, "Process Parameter Control: the Key to Optimization," Plastics Engineering, vol. 30, pp. 25-27, 1974.

Knights, M., "Injection Mold Balance Unbalanced," Plastics Technology, http://www.ptonline.com/articles/200811fal.html; Nov. 2008, 5 pages.

Li, et al., "A Real-Time Process Optimization System for Injection Molding," Polymer Engineering and Science, 2009, 10 pages.

Li, et al., "Predicting the Parts Weight in Plastic Injection Molding Using Least Squares Support Vector Regression," IEEE Transactions on Systems, Man, and Cybernetics—Part C: Applications and Reviews, vol. 38, No. 6, Nov. 2008, 7 pages.

Liu, et al, "Identification and Autotuning of Temperature-Control System With Application to Injection Molding," IEEE Transactions on Control Systems Technology, vol. 17, No. 6, Nov. 2009, 13 pages.

M. Berins, "Standards for Molding Tolerances," in SPI Plastics Engineering Handbook of the Society of the Plastics Industy, Inc. (5th Edition) 5th ed: Kluwer Academic Publishers, 1991, pp. 821-844.

Mei, et al., "The Optimization of Plastic Injection Molding Process Based on Support Vector Machine and Genetic Algorithm," International Conference on Intelligent Computation Technology and Automation, 2008, 4 pages.

N. M. Morris and W. B. Rouse, "The Effects of Type of Knowledge Upon Human Problem Solving in a Process Control Task," IEEE Transactions on Systems, Man and Cybernetics, vol. SMC-15, No. 6 pp. 698-707, 1985.

N. Yonehara and Lito, "Finding an optimal operation conditions of plastic molding by artificial neural network," Nippon Kikai Gakkai Ronbunshu, C Hen/Transactions of the Japan Society of Mechanical Engineers, Part C, vol. 63, pp. 3538-3543, 1997.

P. Knepper and D. Kazmer, "Multi-objective velocity profile optimization," Charlotte, NC, United States, 2006, pp. 1093-1097.

R. H. Myers and D. C. Montgomery, "Response Surface Methodology: Process and Product Optimization Using Designed Experiments," in Wiley Series in Probability and Statistics, ed: Wiley Interscience, 1995, p. 248.

R. Ivester, et al., "Automatic tuning of injection molding by the virtual search method," Journal of Injection Molding, vol. 2/No. 3, Sep. 1998.

Shu, etal., "PID Neural Network Temperature Control System in Plastic Injecting-moulding Machine," Third International Conference on Natural Computation, 2007, 5 pages.

State space (controls),State space (controls)—Wikipedia, the free encyclopedia [online], 11 pages [retrieved on Sep. 14, 2010]. Retrieved from the Internet: <URL: http://en.wikipedia.org/wiki/State_Space_(controls)>.

Tan etal., "Adaptive Control of Ram Velocity for the Injection Moulding Machine," IEEE Transactions on Control Systems Technology, vol. 9, No. 4, Jul. 2001, 9 pages.

Triefenbach, F., "Design of Experiments: The D-Optimal Approach and Its Implementation As a Computer Algorithm," Bachelor's Thesis in Information and Communication Technology, Jan. 15, 2008, 84 pages.

Yang J. H., "Nonlinear Adaptive Control for Injection Molding Machines," IEEE Xplore, Oct. 29, 2009, 6 pages.

You et al., "Research on Temperature Measure and Control Method in Mold-Temperature-Control Solidification," IEEE International Conference on Control and Automation WeCP-18, Guangzhou, China—May 30 to Jun. 1, 2007, 4 pages.

Fugee Tsung, Jianjun Shi, C.F. J. Wu: "Joint Monitoring ofPID-Controlled Processes" Journal of Quality Technology, vol. 31, No. 3, Jul. 1, 1999 (Jul. 1, 1999), pp. 275-285, XP002579609.

Chen et al., "Plasma etch modeling using optical emission spectroscopy," J. Vac. Sci. Technol. A 14(3), May/Jun. 1996, pp. 1901-1906.

Eriksson et al., *Multi-and Megavariate Data Analysis: Part I Basic Princiules and Auulications* (2nd. ed.), Umetrics Academy (2006).

Eriksson et al., *Multi- and Megavariate Data Analysis: Part II Advanced Auulications and Method Extensions* (2nd. ed.), Umetrics Academy (2006).

Gallagher et al., "Development and Benchmarking of Multivariate Statistical Process Control Tools for a Semiconductor Etch Process: Improving Robustness through Model Updating," IFAC ADCHEM'97, 78-83, Banff, Canada, Jun. 1997.

Goodlin et al., "Simultaneous Fault Detection and Classification for Semiconductor Manufacturing Tools," 201st Meeting of the Electrochemical Society, International Symposium on Plasma Processing XIV, Abs. 413, Philadelphia, PA, May 2002, 16 pages.

Goodlin et al., "Simultaneous Fault Detection and Classification for Semiconductor Manufacturing Tools," Journal of the Electrochemical Society, 150 (12), May 12, 2002, pp. G778-G784.

"Hotelling's T squared," Engineering Statistics Handbook [online], Ch. 6.5.4.3, 2 pages [retrieved on Jan. 13, 2006]. Retrieved from the Internet: <URL: http://www.itl.nist.gov/div898/handbook/pmc/section5/pmc543.htm>.

Kresta et al., "Multivariate Statistical Monitoring of Process Operating Performance," The Canadian Journal of Chemical Engineering, vol. 69, Feb. 1991, pp. 35-47.

Jiang et al., "Fault Diagnosis for Batch Processes Based on Improved MFDA," 2005 IEEE International Conference on Systems Man, and Cybernetics, vol. 4, pp. 3420-25, Oct. 10-12, 2005, IEEE, Piscataway, NJ, (ISBN 0-7803-9298-1).

Lymberopoulos et al., "Advanced Process Control Comes of Age," Semiconductor International [online], 5 pages, Jul. 1, 2004 [retrieved on Nov. 19, 2008]. Retrieved from the Internet: <URL: http://www.semiconductor.net/index.asp?layout=articlePrint&articleiD=CA430898>.

Martin et al., "Multivariate Statistical Process Control and Process Performance Monitoring," IFAC Dynamics and Control of Process Systems, 1999, XP-000911903, pp. 347-356.

Mason et al., "Applying Hotelling's Y Statistic to Batch Processes," J. Quality Technology, vol. 33, No. 4, Oct. 2001, pp. 466-479.

(56) References Cited

OTHER PUBLICATIONS

"Pearson's Correlation Coefficient," Teach/Me Data Analysis [online], 2 pages [retrieved on Dec. 9, 2005]. Retrieved from the Internet: <URL: http://www.vias.org/tmdatanaleng/cc_carr_coeff.html>.

"Process leaps without new hardware," EuroAsia Semiconductor [online], Nov. 2004, 3 pages [retrieved on Nov. 19, 2008]. Retrieved from the Internet: <URL http://www.euroasiasemiconductor.com/print_version.php?id=5677>.

Skumanich et al., "Advanced etch applications using tool-level data," Solid State Technology [online], 7 pages [retrieved on Jan. 27, 2005]. Retrieved from the Internet: <URL: http:/Isst.pennnet.com/articles/article_display.cfm?section=archi&article_id=206470&vers . . . >.

Smith et al., "From Sensor Data to Process Control: A Networked Framework," Semiconductor Manufacturing Magazine, Jul. 2004, 6 pages.

Smith et al., "Practical, Real-Time Multivariate FDC," Semiconductor International [online], Dec. 1, 2004, 6 pages [retrieved on Dec. 16, 2005]. Retrieved from the Internet: <URL: http://www.reed-electronic s.com/semiconductor/index.asp?layout=articlePrint&articleiD=CA483628>.

Solomon et al., "Real-Time Measurement of Film Thickness, Composition, and Temperature by FT-IR Emission and Reflection Spectroscopy," in Semiconductor Characterization: Present Status and Future Needs, (Bullis et al.) AIP Press, 1996, pp. 544-548.

"TOOLweb Blue Box Professional: Enabling High Speed, Multi-User Connectivity and Data Sharing," Control & Information Technology [online], Mar. 2005,4 pages [retrieved on Nov. 19, 2008]. Retrieved from the Internet: <URL: http://www.mksinst.com/docs/ur/ipcblueds.pdf>.

"TOOLweb Applications Support: AEC/APC Applications Engineering, Integration and Deployment Support," Control & Information Technology [online], Sep. 2005, 4 pages [retrieved on Nov. 19, 2008]. Retrieved from the Internet: <URL: http://www.mksinstcom/docs/UR/TWT3DS.pdf>.

"TOOLweb: APC & e-Diagnostics Suite," Control & Information Technology [online], 4 pages [retrieved on Nov. 19, 2008]. Retrieved from the Internet: <URL: http://www.mksinst.com/docs/ur/twmvads.pdf>.

"TOOLweb SenseLink: Web-Enables Existing Sensors," Control & Information Technology [online], 4 pages [retrieved on Nov. 19, 2008]. Retrieved from the Internet: <URL: http://www.mksinst.com/docs/ur/twsenselinkds.pdf>.

"User's Guide to SIMCA-P, SIMCA-P+,"Umetrics AB, Version 11.0, May 17, 2005, pp. 1-456.

Wang et al., "Process Monitoring in Principal Component Subspace: Part 1. Fault Reconstruction Study," 2004 IEEE International Conference on Systems, Man and Cybernetics, The Hague, The Netherlands, vol. 6, Oct. 10-13, 2004, pp. 5119-5124.

Wold et al., "Hierarchical Multiblock PLS and PC Models for Easier Model Interpretation and as an Alternative to Variable Selection," Journal of Chemometrics, vol. 10, 1996, pp. 463-482.

Wold et al., "Modelling and diagnostics of batch processes and analogous kinetic experiments," Chemometrics and Intelligent Laboratory Systems, vol. 44, Nos. 1-2, 1998, pp. 331-340.

Wold et al., "2.10 Batch Process Modeling and MSPC," in *Comprehensive* Chemometrics: Chemical and Biochemical Data Analysis, (Brown et al. Eds.), Oxford, UK: Elsevier, 37 pages (2009).

Xu et al., "A Novel Combination Method for On-Line Process Monitoring and Fault Diagnosis," IEEE IS1E 2005, Dubrovnik, Croatia, Jun. 20-23, 2005, pp. 1715-1719.

F. Yacoub, et al., "Product and Control in the Latent Variable Space of Nonlinear PLS Models," Chemometrics and ntelligent Laboratory Sytems, 70, pp. 63-74, 2004.

* cited by examiner

FIG. 5

| 270 → | B_a | V1 | V2 | V3 | V4 | V5 |
|---|---|---|---|---|---|---|
| | B_b | V1 | V2 | V3 | V4 | V5 |
| | B_c | V1 | V2 | V3 | V4 | V5 |
| | B_d | V1 | V2 | V3 | V4 | V5 |

FIG. 6

| 272 → | B_a | V3 | V4 | V5 |
|---|---|---|---|---|
| | B_b | V3 | V4 | V5 |
| | B_c | V3 | V4 | V5 |
| | B_d | V3 | V4 | V5 |

FIG. 7a

| | | | | | | |
|---|---|---|---|---|---|---|
| B1 | V3 | | V4 | | V5 | |
| B2 | V3 | | V4 | | V5 | |
| B3 | V3 | | V4 | | V5 | |
| B4 | V3 | | V4 | | V5 | |

| | | | | | | | | |
|---|---|---|---|---|---|---|---|---|
| B1 | V1 | V1_F | V2 | V2_F | V3 | | V4 | V5 |
| B2 | V1 | V1_F | V2 | V2_F | V3 | | V4 | V5 |
| B3 | V1 | V1_F | V2 | V2_F | V3 | | V4 | V5 |
| B4 | V1 | V1_F | V2 | V2_F | V3 | | V4 | V5 |

290

292

MULTIVARIATE PREDICTION OF A BATCH MANUFACTURING PROCESS

CROSS REFERENCE TO RELATED APPLICATIONS

This application is a continuation-in-part of U.S. Ser. No. 13/441,513, filed Apr. 6, 2012, and titled "Multivariate Monitoring of a Batch Manufacturing Process," the content of which is hereby incorporated by reference in its entirety.

TECHNICAL FIELD

The invention generally relates to data analysis of a batch manufacturing process, and particularly, to in-process prediction of future behavior of a batch manufacturing process.

BACKGROUND

Massive data sets can be collected during manufacturing processes and in connection with research and development activities. Manufacturing processes are sometimes categorized as either "batch" manufacturing processes or "continuous" manufacturing processes. In a batch manufacturing process, a series of steps are performed on a set of raw and/or processed materials over a finite duration to produce a product with desired properties. In some batch processes, processing occurs at a single workstation (e.g., a chamber or container) involving one or more process tools (e.g., process tools within the chamber or container). Examples of batch manufacturing processes include semiconductor wafer processing (e.g., wafer processing resulting in a set of chips), pharmaceutical processing (e.g., the process results in an intermediate or final output set of chemicals, compounds or drugs), or biotechnology processing (e.g., the process results in a particular biological fermentation or cell culture process). In contrast, in continuous manufacturing processes, materials are manufactured, processed or produced substantially without interruption.

As an example, in the semiconductor device manufacturing industry, as device geometries shrink to the nanometer scale, complexity in manufacturing processes increases, and process and material specifications become more difficult to meet. For example, a typical process tool used in current semiconductor manufacturing can be described by a set of several thousand process variables. The variables are generally related to physical parameters of the manufacturing process and/or tools used in the manufacturing process. In some cases, of these several thousand variables, several hundred variables are dynamic (e.g., changing in time during the manufacturing process or between manufacturing processes). The dynamic variables (e.g., gas flow, gas pressure, delivered power, current, voltage, and temperature) can change, sometimes non-linearly, based on a variety of factors, including, for example, a specific processing recipe, the particular step or series of steps in the overall sequence of processing steps, errors and faults that occur during the manufacturing process or changes in parameters.

Generally, process variables associated with a manufacturing process can be divided into two different types, X-type variables (also known as X-variables or inputs) and Y-type variables (also known as Y-variables or outputs). X-type variables are indicative of factors, predictors, or indicators and are used to make projections or predictions about the manufacturing process or results of the manufacturing process. Y-type variables are indicative of yields or responses of the manufacturing processes. X-type variables and Y-type variables are generally related to each other.

Often, the exact relationship between the X-type variables and Y-type variables is uncertain or difficult or impossible to determine. The relationship can, in some instances, be approximated or modeled by various techniques, such as linear approximation, quadratic approximation, polynomial fitting methods, exponential or power-series relationships, multivariate techniques (e.g., principal component analysis or partial least squares analysis), among others. In such cases, the relationship between X-type variables and Y-type variables can be inferred based on observing changes to one type of variables and observing responses on the other type of variables.

In a manufacturing process, it is important to be able to predict future behavior of process variables in real time or in near real time as the process progresses, but before the process is completed. Predicted process behavior can have many applications, one of which is to monitor the future trajectories of critical process parameters. For example, in biological manufacturing, early warnings of toxin production, nutrient levels, growth kinetics and other cell performance metrics can be used to make corrective decisions for steering the process to improve yield or provide consistent quality. Another application is to provide an estimate of the yield of the process before it is completed, which can be used to induce proactive modifications to the process or downstream operations. For example, in biological manufacturing, early detection of a low yield can be used as a basis for making adjustments to the process recipe to account for variations in cell performance (e.g., variations in growth rate). In general, based on estimated future behavior of process variables, an operator can have advanced warnings of potential deviations and faults and develop avoidance strategies accordingly during process execution.

There are several existing approaches for predicting the future behavior of a manufacturing process. For example, when a batch process is partially completed, imputation methods can be used to estimate the future trajectories of process variables. Using imputation, estimated future trajectory of a manufacturing process can be determined based on measured historical values of various process variables. However, existing imputation approaches are iterative in nature and often take many iterations before convergence to a fairly accurate prediction.

SUMMARY

Therefore, there is a need for more efficient methods and systems for predicting the future behavior of a manufacturing process in real time or in near real time, especially in a batch manufacturing processes.

In one aspect, a computer-implemented method for predicting prospective behavior of a manufacturing process is provided. The method includes receiving, by a computing device, measured values of a plurality of variables of the manufacturing process, including measured values of the plurality of variables associated with at least one historical batch run and measured values of the plurality of variables associated with at least one current batch run. The plurality of variables includes at least one dependent variable that represents a process parameter whose value is dependent on one more process conditions. The method also includes using, by the computing device, a partial least squares (PLS) regression approach to estimate an unknown future value of the at least one dependent variable at a future point in time in the at least one current batch run. Using the PLS regression approach includes creating a X matrix that includes the measured values of the plurality of variables associated with the at least one historical batch run, creating a Y matrix that includes the measured value of the at least one dependent variable associated with the at least one historical batch run, applying the PLS regression approach to determine a relationship between the X matrix and the Y matrix, and using the relationship and the measured values of the plurality of variables associated with the at least one current batch run to estimate the unknown future value of the at least one dependent variable for the at least one current batch run.

In another aspect, a prediction system for a batch-type manufacturing process associated with a finite duration is provided. The prediction system includes one or more sensors for measuring values of a plurality of variables of the manufacturing process including at least one dependent variable that represents a process parameter whose value is dependent on one more process conditions. The measured values include measured values of the plurality of variables associated with at least one historical batch run and measured values of the plurality of variables associated with at least one current batch run. The prediction system also includes a prediction module for estimating an unknown future value of the at least one dependent variable at a future point in time in the at least one current batch run using a partial least squares (PLS) regression approach. The prediction module includes a calibration component and an estimation component. The calibration component is configured to determine (1) a X matrix including the measured values of the plurality of variables associated with the at least one historical batch run, (2) a Y matrix including the measured value of the at least one dependent variable associated with the at least one historical batch run; and (3) a relationship between the X matrix and the Y matrix determined based on the PLS regression approach. The estimation component is configured to estimate the unknown future value of the at least one dependent variable in the at least one current batch run using the relationship from the calibration component and the measured values of the plurality of variables associated with the at least one current batch run.

In other examples, any of the aspects above can include one or more of the following features. The manufacturing process can be a batch-type manufacturing process associated with a finite duration. In some embodiments, the measured values of the plurality of variables associated with the at least one current batch run represent values measured from the plurality of variables up to a current maturity point in time. The estimated relationship between the X and Y matrices can be used to predict a plurality of future values of the at least one dependent variable at a plurality of future points in time after the current maturity point to the end of the finite duration for the at least one current batch run.

In some embodiments, the at least one dependent variable is not directly assignable during the manufacturing process. In some embodiments, the measured values of the at least one dependent variable associated with the at least one historical batch run appears in both the X matrix and the Y matrix.

In some embodiments, the plurality of variables of the manufacturing process further include at least one manipulated variable that represents a process parameter whose value is assignable or specifiable during the manufacturing process. In addition to the measured values of the at least one manipulated variable associated with the current batch run, at least one future value of the at least one manipulated variable for the current batch run can be received. Using the relationship from the calibration component, the measured values of the plurality of variables and the at least one future value of the at least one manipulated variable for the current batch run, the unknown future value of the at least one dependent variable for the current batch run can be predicted. In some embodiments, the at least one future value of the at least one manipulated variable represents a known value for setting the at least one manipulated variable at a future point in time in the current batch run.

In some embodiments, the PLS regression approach is run only once without iteration to determine the relationship between the X and Y matrices.

In some embodiments, multivariate analysis is performed on a combination of (1) the measured values of the plurality of variables and (2) the estimated future value of the at least one dependent variable to generate a plurality of multivariate statistics. In some embodiments, the multivariate analysis is performed on a combination of the measured values of the plurality of variables and a plurality of estimated future values of the at least one dependent variable to generate the multivariate statistics, where the plurality of estimated future values of the at least one dependent variable correspond to a plurality of future points in time. The plurality of multivariate statistics can represent a trajectory of at least one of past, current or estimated future behavior of the manufacturing process.

In some embodiments, the manufacturing process comprises growing a cell culture medium to achieve one or more quality profiles for the cell culture medium. In this case, the plurality of variables of the manufacturing process comprise a plurality of physical, chemical and biological parameters. The PLS regression approach is used to estimate an unknown future value of at least one dependent variable from the plurality of physical, chemical and biological parameters to achieve the one or more quality profiles. The physical parameters can include at least one of temperature, gas flow rate or agitation speed. The chemical parameters can include at least one of dissolved oxygen concentration, carbon dioxide concentration, pH concentration, osmolality, redox potential, metabolite level, amino acid concentration or waste by-products production. The biological parameters can include at least one of viable cell concentration, intracellular measurements or extra-cellular measurements. The one or more quality profiles can comprise a carbon dioxide profile, impurity profile, osmolality profile, viable cell concentration profile, and pH profile.

In another aspect, a computer-implemented method is provided for monitoring a manufacturing process. The method includes receiving, via a computing device, measured values of a plurality of variables of the manufacturing process. The variables include at least one of manipulated variables or dependent variables. The method also includes determining, with the computing device, future values of the manipulated variables or future values of the dependent variables, or a combination thereof. The manipulated variables represent process parameters whose values are directly assignable during the manufacturing process and the dependent variables represent process parameters whose values are dependent on process conditions. The method further includes performing multivariate analysis, via the computing device, on a combination of (1) the measured values of the variables and (2) at least one of the future values of the manipulated variables or the future values of the dependent variables to generate multiple multivariate statistics.

In another aspect, a multivariate monitor is provided for a batch-type manufacturing process associated with a finite duration. The monitor includes one or more sensors for measuring values of a plurality of variables of the manufacturing process up to a current maturity point of the finite duration. The variables include at least one of manipulated variables or dependent variables. The monitor includes a prediction module for computing future values of the dependent variables after the current maturity point. The dependent variables represent one or more process parameters whose values are not directly assignable. The monitor also includes an analysis module for performing multivariate analysis on the measured values of the variables and the future values of the dependent variables to generate multiple multivariate statistics, which represent a trajectory of estimated past, current and future behavior of the batch-type manufacturing process over at least a portion of the finite duration.

In some embodiments, the prediction module determines future values of the manipulated variables representative of a set of known values for setting the manipulated variables at one or more future points in time. The manipulated variables can be directly assignable during the manufacturing process. The analysis module can perform multivariate analysis on a combination of the measured values of the variables, the future values of the manipulated variables and the future values of the dependent variables to generate the multivariate statistics.

In some embodiments, the trajectory includes predicted future behavior of the batch-type manufacturing process from the current maturity point to the end of the finite duration. In some embodiments, the monitor includes a fault detection module for predicting a future fault of the manufacturing process based on the trajectory.

In another aspect, a system is provided for monitoring a manufacturing process. The system includes a receiving means for receiving measured values of a plurality of variables of the manufacturing process. The variables include at least one of manipulated variables or dependent variables. The system includes a determination means for determining future values of the manipulated variables, future values of the dependent variables, or a combination thereof. The manipulated variables represent process parameters whose values are directly assignable during the manufacturing process and the dependent variables represent process parameters whose values are dependent on process conditions. The system also includes an analysis means for performing multivariate analysis on a combination of (1) the measured values of the variables and (2) at least one of the future values of the manipulated variables or the future values of the dependent variables to generate multiple multivariate statistics.

In other examples, any of the aspects above can include one or more of the following features. The manufacturing process can be a batch-type manufacturing process associated with a finite duration. In some embodiments, the multivariate analysis is performed based on at least one unfolded data matrix established using observation-wise unfolding of a batch data array, such that each row of the unfolded matrix includes observation of the variables at a unique time sample within the finite duration. In some embodiments, the variables are measured or known up to a current maturity point within the finite duration of the batch-type manufacturing process. In some embodiments, the estimated future values of the dependent variables span from after the current maturity point to the end of the finite duration.

The multivariate statistics can represent a trajectory of estimated past, current and future behavior of the manufacturing process. This trajectory can be used to predict a future fault of the manufacturing process. In some embodiments, the multivariate statistics are compared with a time-varying reference model of the manufacturing process to detect a fault in the manufacturing process.

In some embodiments, the dependent variables are not directly assignable during the manufacturing process. The values of the dependent variables can be dependent on at least one of: (1) past values of the dependent variables, (2) past values of the manipulated variables, or (3) future values of the manipulated variables.

In some embodiments, the future values of the manipulated variables represent known values for setting the manipulated variables at one or more future points in time subsequent to the maturity point.

In some embodiments, the future values of the dependent variables are predicted using at least one of an imputation method or a regression method based on the measured values of the plurality of variables and optionally, the future values of the manipulated variables.

In some embodiments, each of the multivariate statistics comprises at least a multivariate score, a Hotelling's $T^2$ value, a DModX value, or any combination thereof. In some embodiments, a multivariate score comprises a principal components analysis t-score or a partial least squares analysis t-score.

In some embodiments, a second set of future values of the manipulated variables is received, which represent hypothesized values for setting the manipulated variables. A multivariate analysis is performed on a combination of (1) the measured values of the variables, (2) the second set of future values of the manipulated variables and (3) the future values of the dependent variables to generate a second set of multivariate statistics. The second set of multivariate statistics can predict an effect of the second set of future values of the manipulated variables on the manufacturing process.

Some implementations include any of the above-described aspects featuring any of the above embodiments or benefits thereof.

These and other features will be more fully understood by reference to the following description and drawings, which are illustrative and not necessarily to scale. Although the concepts are described herein with respect to a manufacturing process, particularly a semiconductor process, it will be apparent to one of skill in the art that the concepts have additional applications, for example, pharmaceutical or biotechnical applications, metallurgic and mining applications, financial data analysis applications, or other applications involving a large number of data points or observations.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 shows an exemplary X-matrix generated by the IBR method of FIG. 4 during the calibration stage.

FIG. 6 shows an exemplary Y-matrix generated by the IBR method of FIG. 4 during the calibration stage.

FIGS. 7a and 7b show exemplary X-matrices generated by the IBR method of FIG. 4 during the prediction stage.

DETAILED DESCRIPTION

Figure 1:
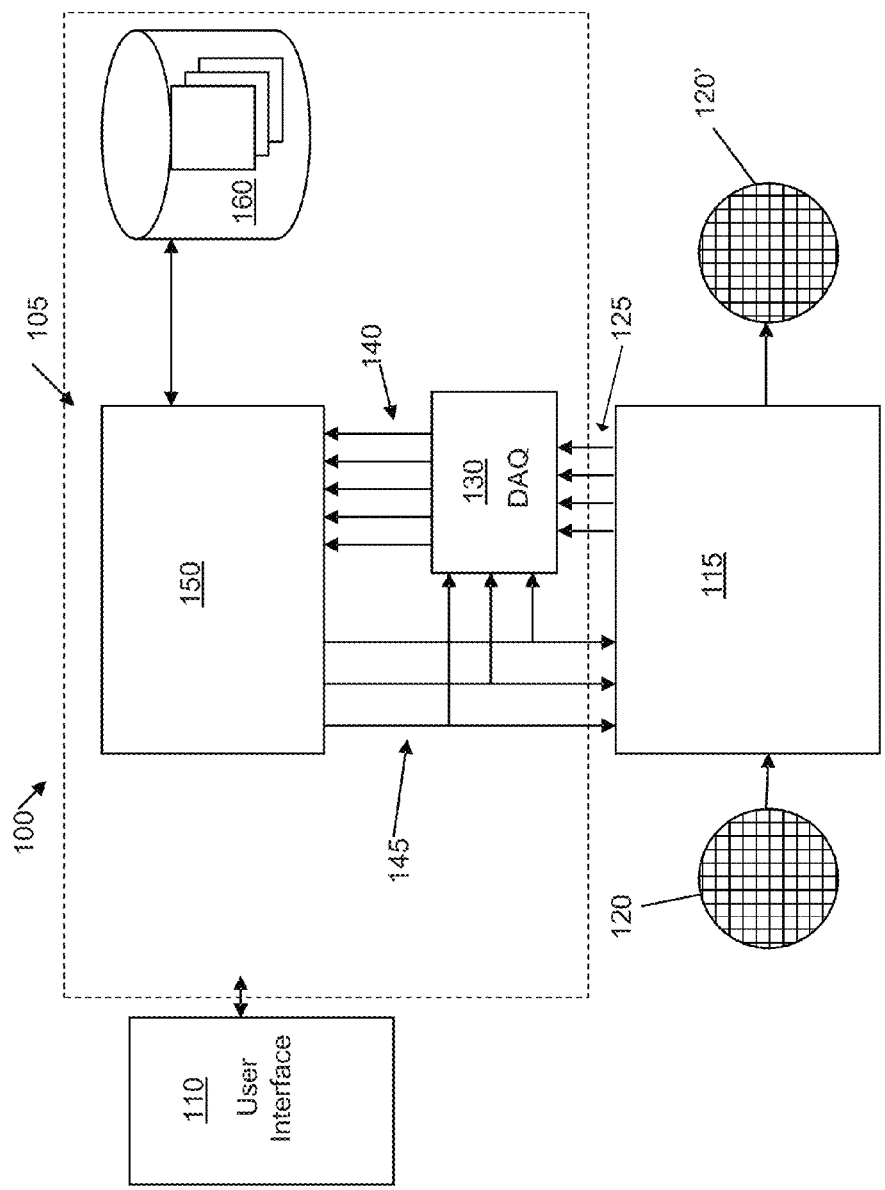
FIG. 1 shows an exemplary block diagram of a system.

FIG. 1 shows an exemplary system 100 that includes a processor 105 and a user interface 110. The user interface 110 can include a computer keyboard, mouse, other haptic interfaces, a graphical user interface, voice input, or other input/output channel for a user to communicate with the processor 105 in response to stimuli from the processor 105 (e.g., to specify values for constraints). The user interface 110 can include a display such as a computer monitor. The processor 105 is coupled to a processing facility 115 that performs manufacturing or processing operations. For example, in the context of the semiconductor industry, the processing facility performs processing functions on a wafer 120 and outputs a processed wafer 120'. The wafer 120 and processed wafer 120' are illustrative only, and can represent any input and/or output of a batch manufacturing process (e.g., a pharmaceutical granulation or blending or other unit processing step, or biotechnology fermentation, cell culture, or purification process). The processing facility 115 can include tools or processes (not shown) for performing tasks such as cleaning, purification, depositing material, mixing materials or chemicals or compounds, dissolving materials or chemicals or compounds, removing materials, rinsing materials, and/or performing other functions within the processing facility 115.

In some embodiments, the tools or processes include multiple stations or units within the facility 115. The functions of the facility 115 can be characterized by variables that represent various physical parameters of the manufacturing process, including, for example, gas pressure, gas flow rate, temperature, time, and/or plasma or chemicals or biochemical concentrations, among many others. In addition, physical parameters corresponding to the variables can be monitored and measured to produce outputs 125. In some embodiments, the outputs 125 include measurements of the process parameters sampled at one or more instances from the beginning of a batch manufacturing process up to a current time (known as a maturity point) of the batch process. The set of measured values for one or more process variables up to the current maturity point can be denoted as $X_k$. In general, a maturity point represents the amount time completed in a batch process.

In some embodiments, the variables measured during the batch manufacturing process are X-type variables. These X-type variables can be further divided into subsets or sub-types. One subset of X-type variables are manipulated variables. Another subset of X-type variables are dependent variables. The set of measured variable data $X_k$ can include measured values of dependent variables and optionally, measured values of manipulated variables. Manipulated variables represent physical parameters that can be directly assigned or specified such as, for example, setpoints for temperature, chemical concentrations, pH, gas pressure, supplied power, current, voltage, or processing time. In some embodiments, the system 100 specifies setpoint or target values assigned to one or more manipulated variables at current and/or certain future points in time (i.e., beyond the current maturity point). The future setpoint or target values of the manipulated variables can be denoted as $X_{mv}$. Dependent variables represent physical parameters that are not directly assignable or specifiable during a manufacturing process. Generally, values of dependent variables are dependent on one or more process conditions. In some embodiments, values of dependent variables are related to, associated with, or dependent on values of one or more manipulated variables, either via known relationships or unknown relationships, which may or may not be empirically determinable and/or modeled. In some embodiments, current or future values of dependent variables depend on at least one of: 1) past values of dependent variables, 2) past values of manipulated variables, or 3) future values of manipulated variables. Examples of dependent variables include chamber temperature, gas pressure, temperature or pressure gradients, impurity levels, spectral and/or chromatographic profiles, and others for a semiconductor manufacturing process.

As shown in FIG. 1, the processing facility 115 is coupled to the processor 105 by a data acquisition module 130. The data acquisition module 130 receives the outputs 125, including the measured variable data $X_k$, from the processing facility 115. In some embodiments, the data acquisition module 130 performs buffering, multiplexing, signaling, switching, routing, formatting, and other functions on the data to put the data in a format or condition for suitable communication or retransmission to other modules of the processor 105.

The system 100 also includes a prediction module 150 configured to receive data from the data acquisition module 130, e.g., via communication links 140. In some embodiments, the data acquisition module 130 relays the output 125 from the processing facility 115 to the prediction module 150. The prediction module 150 uses a time-varying model to predict future values of one or more dependent variables at different future points in time until, for example, the end of a batch manufacturing process. The future values of one or more dependent variables are herein denoted as $X_{D\text{-}future}$. The $X_{D\text{-}future}$ data reflects the effect of the dependent and/or manipulated variables measured up to the current maturity ($X_k$) and, optionally, future values of the manipulated variables ($X_{mv}$) on the values of the dependent variables for the remainder of the process. The prediction module 150 can further include several components. For example, the prediction module 150 can include a calibration component (not shown) configured to develop a model of batch behavior based on historical data collected from completed batch runs. The prediction module 150 can also include an estimation component (not shown) configured to estimate future values of process variables in one or more current batch runs based the model created by the calibration component.

The system 100 further includes a memory 160, which is configured to communicate with at least the prediction module 150. The memory 160 can be used to store different data sets generated at each maturity point. For example, at a current maturity point, the memory 160 can store at least one of the measured past and present values of the process variables $X_k$, known values of the manipulated variables $X_{mv}$, or predicted values of the dependent variables $X_{D\text{-}future}$. In general, the memory 160 can store data collected from current and previous batch runs.

Figure 2:
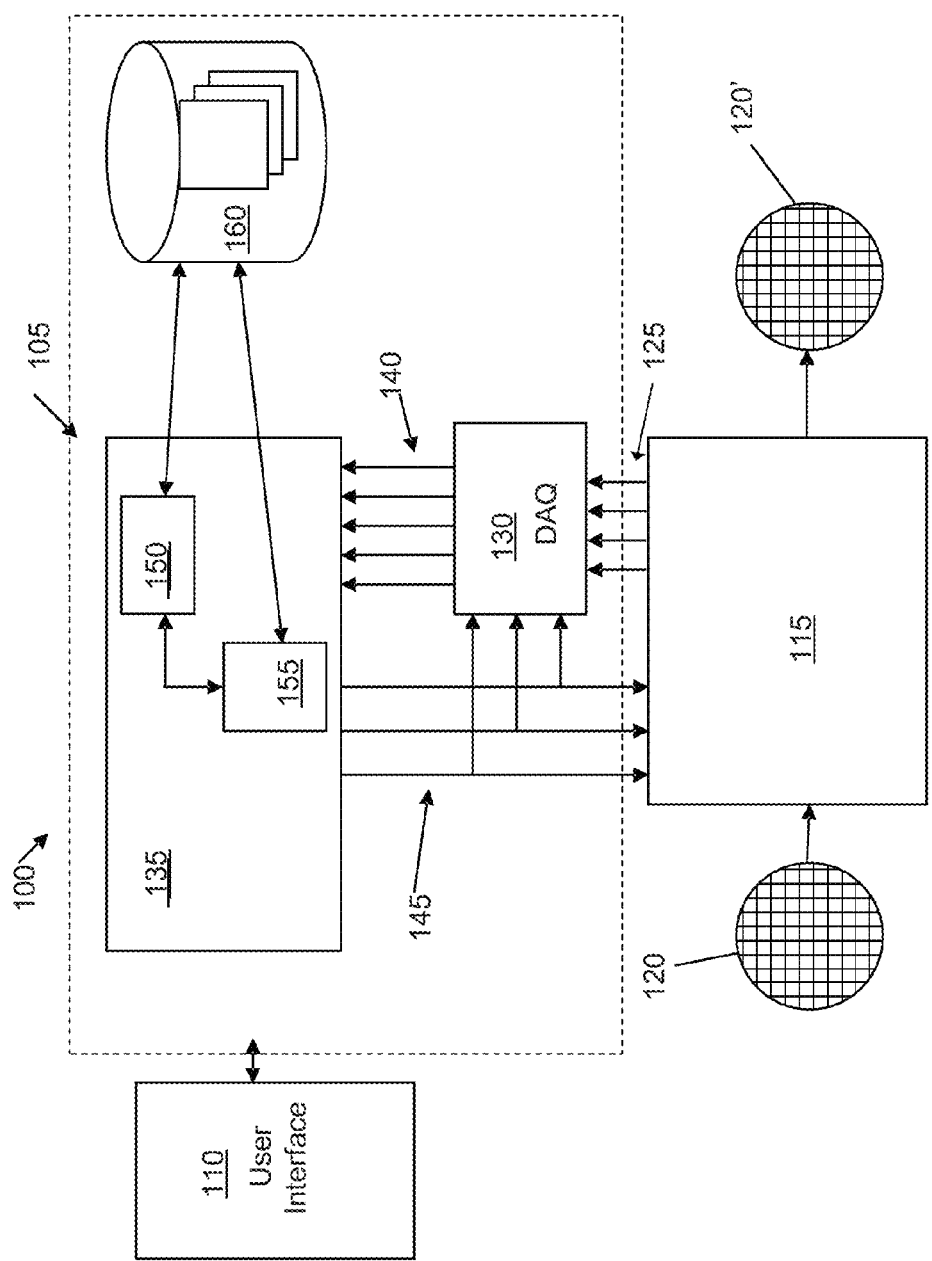
FIG. 2 shows another exemplary block diagram of a system.

In some embodiments, the prediction module 150 can be incorporated in a monitoring system for monitoring at least one of past, present or future behavior of a manufacturing process. FIG. 2 shows an exemplary system 200 similar to the system 100 of FIG. 1, but includes a monitoring module 135 that incorporates the prediction module 150 and an analysis module 155. The analysis module 155 receives measured values of various process variables from the data acquisition module 130 and predicted future values of the dependent variables $X_{D\text{-}future}$ from the prediction module 150. Based on the received data, the analysis module 155 can determine the quality of a batch process by computing a trajectory that illustrates the time-varying difference between (a) measured and predicted values of various process variables and (b) optimal values of the variables. An operator can predict future faults for the remainder of the batch using the trajectory.

Figure 3:
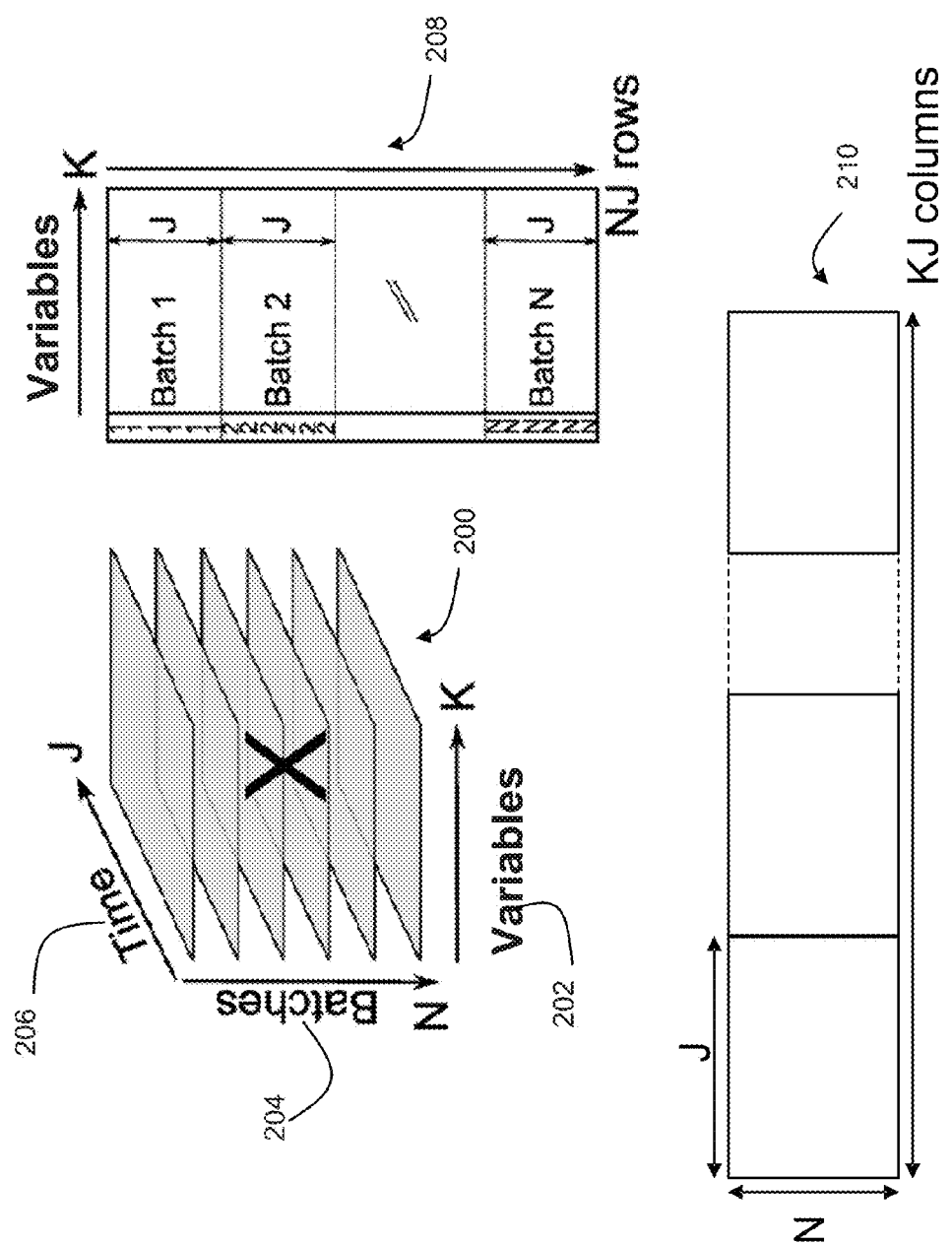
FIG. 3 shows an observation-wise unfolding technique and a batch-wise unfolding technique.

To facilitate mathematical analysis of a batch process for the purpose of predicting and monitoring process behavior, three-dimensional data related to the batch process can be unfolded and stored in a two-dimension matrix using a number of different approaches. FIG. 3 illustrates (1) an observation-wise unfolding technique used to represent three-dimensional batch data 200 as a two-dimensional matrix 208 and (2) a batch-wise unfolding approach used to represent the batch data 200 as another two-dimensional matrix 210. The three-dimensional batch data 200 includes values of multiple process variables 202 either measured or predicted for one or more time samples 206 and associated with one or more batches 204. In some embodiments, the process variables 202 are X-type variables. The two-dimensional matrix 208 generated by observation-wise unfolding shows that each row includes measured and predicted values (i.e. observations) of the process variables 202 corresponding to a unique point in time. In contrast, the two-dimensional matrix 210 generated by batch-wise unfolding shows that each row includes values of the process variables 202 over time corresponding to a unique batch. In some applications, using the observation-wise unfolding technique to unfold batch data is advantageous because the resulting batch evolution control charts of multivariate metrics generated (not shown) are similar to typical univariate control charts that are familiar to operators and scientists alike, thus allowing time-dependent process events to be visualized intuitively. The batch evolution control charts can track the state of a process relative to one or more maturity points to display process trajectory. In other application, the batch-wise unfolding technique is preferred.

During execution of a batch manufacturing process, the prediction component 150 of the system 100 can use a multivariate method to estimate the future behavior of the manufacturing process beyond a current maturity point in a current batch run, such as values of the dependent variables at various future points in time. The prediction component 150 can estimate these future values based on historical batch data collected for the manufacturing process up to the current maturity point for the current batch run and/or historical batch data collected for previous batch runs. The prediction component 150 can compute the future trajectory of the dependent variables using one or more methods including: 1) imputation based on a principal component analysis model or a partial least squares multivariate model and/or 2) a regression model.

Figure 4:
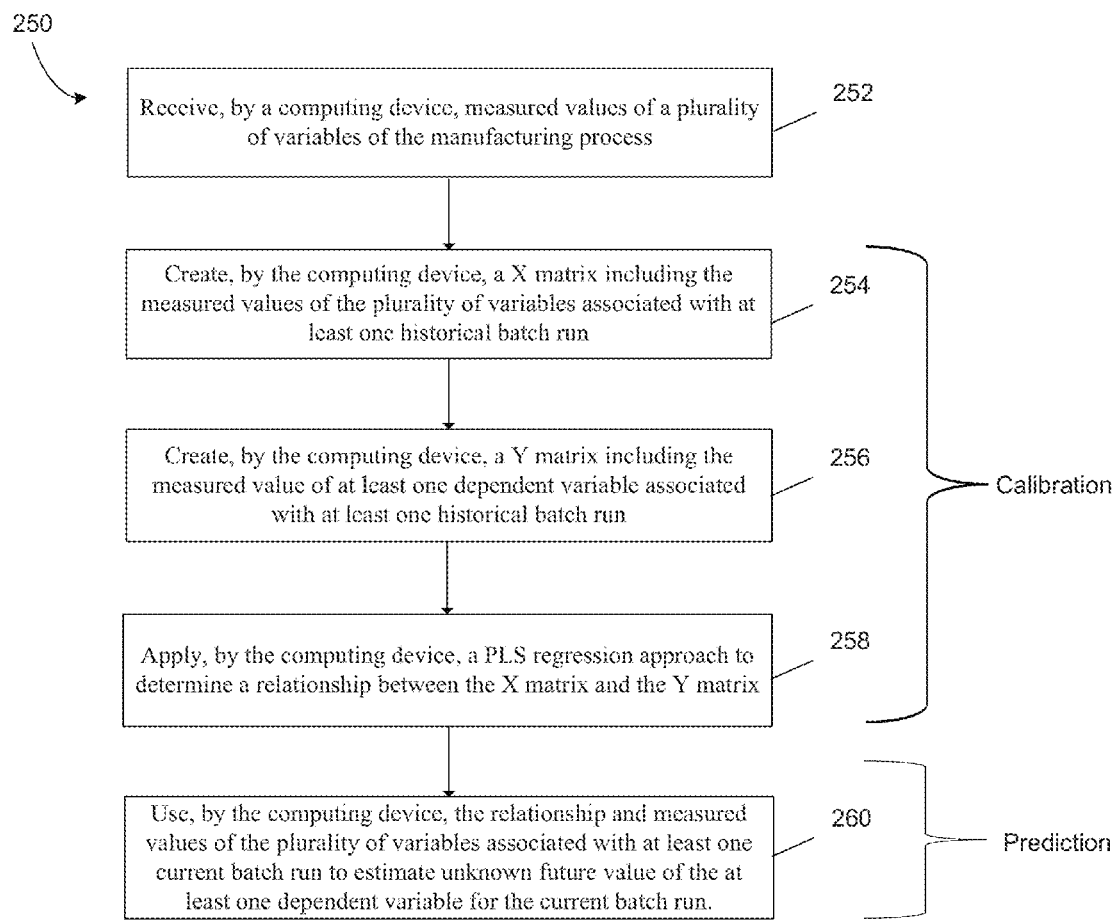
FIG. 4 shows an exemplary imputation by regression (IBR) method for predicting prospective behavior of a manufacturing process.

In some embodiments, the prediction component 150 uses an imputation by regression (IBR) method to estimate future values of the dependent variables of a batch manufacturing processing using a PLS model. FIG. 4 shows an exemplary IBR method 250 for predicting prospective behavior of a manufacturing process in a current batch run. In general, the IBR method 250 includes two parts: (1) model calibration; and (2) prediction. First, measured values of one or more variables of the manufacturing process are collected (step 252). The measured values of the process variables can include two types: (1) measured values of the process variables associated with one or more historical batch runs that have been completed, where the historical data is used to train the PLS model; and (2) measured values of the process variables associated with a current batch run that are measured up to a current maturity. The IBR method 250 is used to predict future values of the process variables in the current batch run subsequent to the current maturity. Model calibration involves creating a X-matrix that includes the measured values of the process variables associated with the historical batch runs (step 254) and creating a Y-matrix that includes the measured values of the dependent variables also associated with the historical batch runs (step 256). Each of the X- and Y-matrices can be generated using the batch-wise unfolding technique described above with reference to FIG. 3. The calibration stage of the IBR method 250 further includes applying a partial least squares (PLS) regression approach (or another projection based approach) to determine a relationship between the X matrix and the Y matrix (step 258). The prediction stage includes using the relationship determined from the calibration stage and the measured values of the process variables associated with the current batch run to estimate unknown future values of the dependent variables at one or more future points in time for the current batch run (step 260).

FIG. 5 shows an exemplary X-matrix that can be generated at step 254 of the IBR method 250 in the calibration stage. The X-matrix represents measured process data collected from process variables during one or more historical batch runs. As shown, the X-matrix 270 of FIG. 5 is generated using the batch-wise unfolding technique described above with reference to FIG. 3, where each row of the X-matrix 270 captures the measured trajectory of one or more variables of a single batch as it evolves from the beginning of the batch to finish. In FIG. 5, data for four completed batches B_a to B_d are used to construct the X-matrix 270, where each batch corresponds to each row of the X-matrix 270. The X-matrix 270 can store measurements of physical parameters corresponding to a set of dependent variables of the historical batch processes and optionally, measurements for a set of manipulated variables of the historical batch processes. For example, the X-matrix 270 includes data in columns V3, V4 and V5, which represents measured values of three dependent variables from the beginning of each batch run to the end of the batch run. The X-matrix 270 also includes data in columns V1 and V2, which represents measured values of two manipulated variables from the beginning of each batch run to the end of the batch run. Measurements associated with the manipulated variables (e.g., columns V1 and V2) are optional and do not need to be included in the X-matrix 270.

FIG. 6 shows an exemplary Y-matrix that can be generated at step 256 of the IBR method 250 in the calibration stage. The Y-matrix can include measurements of physical parameters corresponding to one or more dependent variables of the historical batch processes. As shown in FIG. 6, the Y-matrix 272 includes data in columns V3, V4 and V5, which represents measured values of three dependent variables associated with the historical batch runs B_a to B_d. The dependent variables can be sampled at one or more time instances from the beginning of each historical batch manufacturing process up to the end of the batch process. Therefore, the measured values of the dependent variables (e.g., data in columns V3, V4 and V5) appear in both the X-matrix 270 and the Y-matrix 272.

Once a X-matrix and a Y-matrix are generated using data from historical process runs, the calibration stage of the IBR method 250 proceeds to apply a partial least squares (PLS) method to determine a relationship between the X matrix and the Y matrix (step 258). Generally, a PLS approach is a regression-based modeling method that correlates variations in a X space to a Y space. In a conventional application of the PLS approach, each process variable is categorized as either a X- or Y-variable, whose time-dependent values appear in one of the X or Y matrix, but not both. The IBR method 250 of FIG. 4 is different from the conventional PLS modeling application in that the measured values of the dependent variables associated with historical process runs are present in both X- and Y-matrices. In some embodiments, a PLS model ($Y=\beta X$) is used to compute the relationship between the X-matrix and Y-matrix, where Y represents the Y matrix assembled at step 256 (e.g., the Y matrix 272), X represents the X matrix assembled at step 254 (e.g., the X-matrix 270) and $\beta$ represents the relationship to be solved. In some embodiments, the relationship $\beta$ has the following form: $\beta=W(P^T W)^{-1} C^T$ that is determined from the PLS model. Specifically, the $\beta$ coefficients are found when the X-matrix is filled, i.e., when all measurements are present.

At step 260 of the IBR model 250, the relationship between the X- and Y-matrices (approximated and calibrated through the PLS model) combined with measured values of the dependent variables associated with a current batch run, can be used to predict future values of the dependent variables in the current batch run. In some embodiments, the following PLS formula is used to calculated the future values of the dependent variables: $X_{D\text{-}future}=\beta X_{new}$, where $X_{D\text{-}future}$ represents the unknown future values of the dependent variables, $\beta$ is from step 258 of the IBR method 250, and $X_{new}$ represents a X matrix constructed using the measured values of the dependent variables associated with the current batch run. Specifically, the following equations are used at the prediction stage to estimate the future values of the dependent variables in a new (i.e., current) batch run:

$$X_{D\text{-}future}=1\cdot\overline{X}_{D\text{-}future}+\hat{T}C', \quad \text{(Equation 1)}$$

where $\overline{X}_{D\text{-}future}$ represents the mean values of $X_{D\text{-}future}$. $C'$ is a matrix of weights expressing the correlation between $X_{D\text{-}future}$ and T that is formed using the relationship $\beta$. In addition, $\hat{T}=[\hat{t}_1, \hat{t}_2, \ldots \hat{t}_A]$, where each $$\hat{t}_i = \frac{p_i^* z_i^T}{p_i^* p_i^{*T}},$$

which represents estimated scores that can be computed using a single component project method. Furthermore, $Z_i$ represents the $X_{new}$ matrix deflated for the $i^{th}$ component. Equation 1 can be a modification of the general PLS equation $X_{D\text{-}future}=1\cdot\overline{X}_{D\text{-}future}+UC'+F$, where $U=T+H$ and represents scores for the $X_{D\text{-}future}$ variables. T can be computed by the equation $X_{new}=1\cdot\overline{X}_{new}+TP'+E$. In addition, E, F and H are residuals. The estimation of the scores U in the general PLS equation can be performed using the single component projection approach as shown in Equation 1 for the IBR method 250.

FIG. 7a shows an exemplary $X_{new}$ matrix for representing measured process data collected up to a current maturity point for a current process run, which can be generated at step 260 of the IBR method 250 during the prediction stage. The $X_{new}$ matrix 280 of FIG. 7a is generated using the batch-wise unfolding technique described above with reference to FIG. 3, where each row of the X-matrix 280 captures the trajectory of one or more variables of a single batch as it evolves over time. As shown in FIG. 7a, four different current batches B1-B4 correspond to four rows of the X-matrix 280. The $X_{new}$ matrix 280 includes a sub-matrix $X_k$ (not shown) that stores measurements of physical parameters corresponding to a set of dependent variables of the batch process. In this example, the sub-matrix $X_k$ includes data in columns V3, V4 and V5, which represent measured values of three dependent variables up to a current maturity. The dependent variables can be sampled at one or more time instances from the beginning of the batch manufacturing process up to the current maturity point. Measurements of the dependent variables can be performed by the physical facility 115, the data acquisition module 130 or the monitoring module 135, or a combination thereof. The $X_{new}$ matrix 280 can include the sub-matrix $X_{D\text{-}future}$ (not shown) that represents unknown future values of the dependent variables at one or more time samples subsequent to the current maturity point. In this example, the sub-matrix $X_{D\text{-}future}$ includes the three columns 282, where each column represents the future unknown values of each of the three dependent variables. In general, the sub-matrix $X_{D\text{-}future}$ is unfilled since the values are unknown and need to be estimated.

FIG. 7b shows another exemplary $X_{new}$ matrix for representing historical data collected up to a current maturity point for a current process run, which can be generated at step 260 of the IBR method 250 during the prediction stage. The $X_{new}$ matrix 290 of FIG. 7b is also generated using the batch-wise unfolding technique. The data matrix 290 includes a sub-matrices $X_k$ (not shown) that stores measurements of physical parameters corresponding to a set of dependent variables of the batch process up to the current maturity as well as measurements of one or more manipulated variables up to the current maturity. In this example, the sub-matrix $X_k$ includes data in columns V3, V4 and V5, which represent measured values of three dependent variables up to a current maturity, and data in columns V1 and V2, which represent measured values of two manipulated variables up to the current maturity. The data matrix 290 also includes sub-matrix $X_{mv}$ (not shown), which represents the known future setpoint or target values for the manipulated variables of the batch process. In this example, the sub-matrix $X_{mv}$ includes data in columns V1_f and V2_f that represent known future setpoint or target values for the two manipulated variables. These setpoint or target values are assigned by the facility 115 to the manipulated variables at one or more future points in time. These values thus represent desired values for the manipulated variables, which are distinguished from the actual measurements of the manipulated variables included in the matrix $X_K$. The data matrix 290 further includes sub-matrix $X_{D\text{-}future}$ (not shown) that is substantially the same as the corresponding sub-matrix $X_{D\text{-}future}$ of FIG. 7a. The sub-matrix $X_{D\text{-}future}$ includes columns 292 that represent unknown future values of the dependent variables at one or more time samples subsequent to the current maturity point. The sub-matrix $X_{D\text{-}future}$ can be unfilled since the values are unknown and need to be estimated.

Based on the $X_{new}$ matrix (e.g., the $X_{new}$ matrix 280 of FIG. 7a or the $X_{new}$ matrix 290 of FIG. 7b) and the relationship β determined from step 258 of the IBR method 250, the future values of the dependent variables $X_{D\text{-}future}$ can be predicted using the following PLS model: $X_{D\text{-}future} = \beta X_{new}$. During this prediction stage, the future values of the dependent variables are missing, as reflecting in columns 282 of the $X_{new}$ matrix 280 or columns 292 of the $X_{new}$ matrix 290. In some embodiments, to run the PLS model, the missing data can be first processed using the single component projection method, as described above with respect to Equation 1. In some embodiments, the $X_{new}$ matrix can be altered and only step 260 of the IBR method 250 needs to be repeated using the altered $X_{new}$ matrix to predict the impact of the alteration on future values of the dependent variables. Alteration of the $X_{new}$ matrix can include, for example, changing the setpoint value of at least one manipulated variable.

In general, features of the IBR method 250 include (1) the use of a single model for predicting future values of one or more dependent variables at any maturity in a current batch run; and (2) the use of the PLS approach in the calibration stage with the measured values of the dependent variables associated with historical process runs that appear in both the X- and Y-matrices. One of the advantages of using the IBR method 250 to estimate future values of the dependent variables in a batch run is that it is a single pass algorithm. No iterations are required to converge on a final solution. Instead, only a single run of the PLS method at step 260 is needed to determine the estimated future values of the dependent variables with a high level of accuracy. Hence, the IBR method 250 is computationally efficient, which is an important quality in real-time or near real-time optimization (e.g., advanced process control) applications, where iterative optimization methods, such as sequential quadratic programming, can be much more costly to use.

Predicted future values of dependent variables in a batch run determined prior to the completion of the batch can be used in many applications. One application is to use the predicted values to estimate the influence of adjustments made to one or more manipulated variables. Another application is to use the predicted values in the multivariate monitoring of a batch system to track the performance of the batch (e.g., estimate a complete batch trajectory) when the batch is partially completed. Such in-process monitoring can provide estimates of batch evolution and behavior trajectories over time until batch completion and/or estimates of final batch conditions and metrics. For example, predicted future values of dependent variables can be inserted into the original X-matrix to complete the matrix, such as into the $X_{new}$ matrix 280 of FIG. 7a (in the columns 282) or the $X_{new}$ matrix 290 of FIG. 7b (in the columns 292). Based on the completed X-matrix, multivariate metrics can be generated to approximate the behavior of the batch process subsequent to the current maturity point. The multivariate metrics include, for example, a multivariate scores matrix, a DModX matrix, a Hotelling $T^2$ matrix, or a combination thereof.

Figure 8:
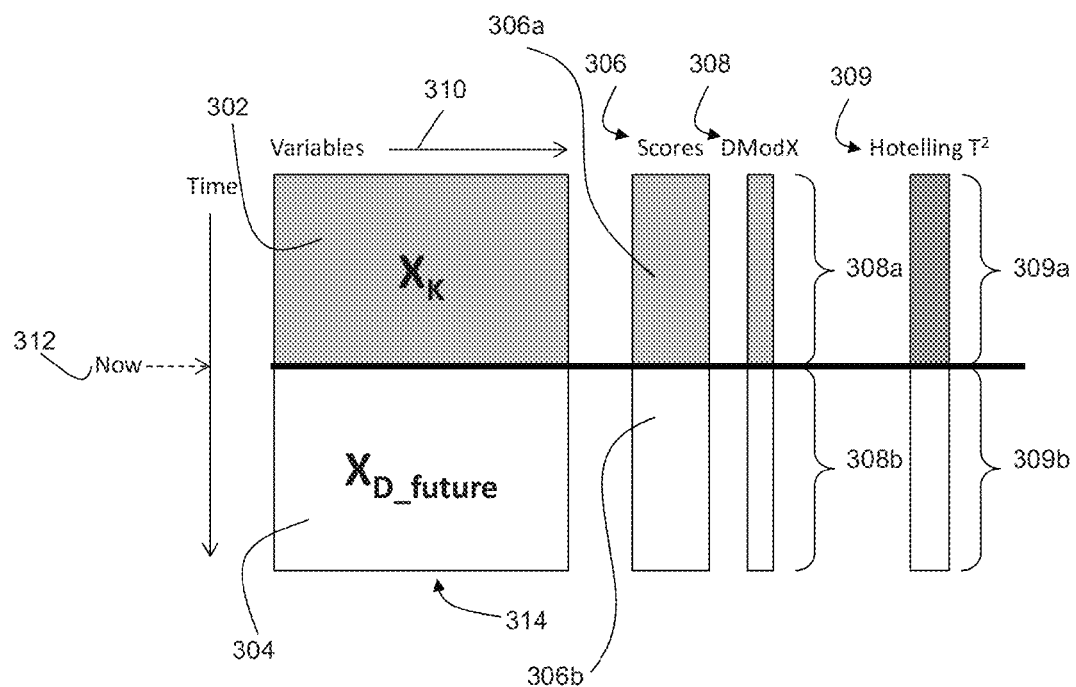
FIG. 8 shows one or more exemplary multivariate metrics generated for monitoring a batch manufacturing process based on an exemplary X-matrix.

FIG. 8 shows one or more exemplary multivariate metrics generated for monitoring a batch manufacturing process based on a completed X-matrix 314. The multivariate scores matrix 306, the DModX matrix 308 and the Hotelling $T^2$ matrix 309 are computed based on the completed X-matrix 314, which includes the sub-matrix $X_k$ 302 for storing measured values of dependent variables up to the current maturity point 312 and the sub-matrix $X_{D\text{-}future}$ 304 for storing predicted future values of the dependent variables determined using the IBR method 250 of FIG. 4. In some embodiments, the analysis component 155 of the monitoring module 135 of FIG. 2 is configured to compute the multivariate scores matrix 306, the DModX matrix 308 and/or the Hotelling $T^2$ matrix 309. In general, each value in the multivariate scores matrix 306, the DModX matrix 308 or the Hotelling $T^2$ matrix 309 summarizes process performance, at a particular point in time based on actual or estimated batch behavior (represented by the data matrix 314). Each of the matrices can be compared to a desired batch behavior (e.g., represented by a multivariate model) to identify deviations. Specifically, the multivariate scores matrix 306 includes multivariate score values 306a quantifying the deviations associated with past and current times of a batch run and multivariate score values 306b predicting the deviations associated with future times of the batch run. Similarly, the DModX matrix 308 includes DModX values 308a quantifying the deviations in the correlation structure of $X_k$ up to the current maturity 312 and DModX values 308b predicting the deviations associated with future times of the batch run. The Hotelling $T^2$ matrix 309 includes Hotelling $T^2$ values 309a quantifying the deviations in the correlation structure of $X_k$ up to the current maturity 312 and Hotelling $T^2$ values 309b predicting the deviations associated with future times of the batch run. In some embodiments, the predicted future values of the dependent variables in the sub-matrix $X_{D\text{-}future}$ 304 makes it possible for the analysis component 155 to estimate the future multivariate score values 306a, the future DModX values 308b and/or the future Hotelling $T^2$ values 309b.

Generally, each value in the multivariate statistics matrix 308, the DModX matrix 308 or the Hotelling $T^2$ matrix 309 can be computed using one or more projection methods such as principle component analysis, partial least squares analysis or other types of multivariate analysis approaches. Using multivariate analysis is advantageous in many applications because it can extract important information from a large data set and present the results as interpretable plots based on the principle of projection.

In some embodiments, each multivariate score in the multivariate scores matrix 306 is a principal component analysis score, a partial least squares score (sometimes called projection to latent structures), or any combination thereof.

In some embodiments, the analysis component 155 performs a Hotelling calculation or a DModX calculation on the data matrix 314 by means of a principal components or partial least squares analysis to determine a $T^2$ or DModX value, respectively. A $T^2$ value can be calculated according to the following equation:

$$T^2 = \left(\frac{\bar{x} - \mu_0}{\sigma}\right)^T S^{-1} \left(\frac{\bar{x} - \mu_0}{\sigma}\right)$$

where:

σ=standard deviation for a particular variable, based on data acquired for previous batches, $$\overline{x} = \begin{bmatrix} \overline{x}_1 \\ \overline{x}_2 \\ \vdots \\ \overline{x}_p \end{bmatrix},$$

measured value of variables, for p variables, $$\mu_0 = \begin{bmatrix} \mu_1^0 \\ \mu_2^0 \\ \vdots \\ \mu_p^0 \end{bmatrix},$$

mean value of variables based on previous batches, for p variables,
$S^{-1}$=an inverse covariance or correlation matrix, which is the inverse of the covariance or correlation matrix, S, illustrated below:

$$S = \begin{bmatrix} \overline{S}_1^2 & \overline{S}_{12} & \overline{S}_{13} & \cdots & \overline{S}_{1p} \\ & \overline{S}_2^2 & \overline{S}_{23} & \cdots & \overline{S}_{2p} \\ & & \overline{S}_3^2 & \cdots & \overline{S}_{3p} \\ & & & \ddots & \vdots \\ & & & & \overline{S}_p^2 \end{bmatrix}$$

where:

$$S_{ij} = \frac{1}{N-1} \sum_{i=1}^{k} \sum_{j=1}^{n_i} (x_{ij} - \overline{x})(x_{ij} - \overline{x})^T,$$

where indices i and j identify the matrix element for both S and x in a generalized k×n matrix.

In the multivariate modeling example above, the X-variables in the above equations usually are score vectors of a principal components or partial least squares model usually with mean values ($\mu_0$) equaling zero. Because these score vectors are orthogonal, the matrices S and $S^{-1}$ are diagonal with the variances and respective inverse variances of each component score vector as diagonal elements.

A t-score value can be thought of as a projection onto a line (e.g., a principal components or partial least squares model axis) in a p-dimensional space that provides an acceptable approximation of the data (e.g., a line that provides an acceptable least squares fit). A second t-score can be used (e.g., a projection onto a line orthogonal to the first line) in some embodiments. In general, a $T^2$ value is a calculation of the weighted distance of manufacturing process variables for an output (e.g., the wafer 120') of the manufacturing process relative to an output produced under normal process operation or based on predicted values of dependent variable data and/or manipulated variable data. One way to understand the meaning of the $T^2$ value is to consider it in terms of a geometric description. A normal manufacturing process is a cluster of data points in a p-dimensional space, where p is the number of measured manufacturing process variables. The pertinent space can also be the reduced dimensionality space of the scores. Hotelling's $T^2$ value is the squared distance of a new output from the center of this cluster of data points weighted relative to the variation output of the in the normal process condition. The variation is often illustrated as a p-dimensional hyper-ellipse that bounds the cluster of data points. In general, Hotelling-type calculations can be used to, for example, determine whether a particular point is an outlier (e.g., outside the hyper-ellipse) with respect to the remainder of the data set. More specifically, a Hotelling calculation can be used to determine whether a particular measured parameter is outside an alarm limit or outside the knowledge space, as determined by a mathematical model for the process parameters being observed.

Another example of a multivariate statistic is a DModX calculation or residual standard deviation calculation. A DModX calculation involves calculating the distance of a particular data point from a location in a p-dimensional space that represents a preferred location (e.g., a location associated with an ideal batch). The DModX value is calculated using a principal components or partial least squares analysis that maps the p-dimensional variable to a lower order (e.g., less than order p) dimensional variable (e.g., a score space). Mathematically, the DModX value is the orthogonal component (or residual) resulting from the principal components or partial least squares analysis. A DModX value can be indicative of a range of values (e.g., a "tolerance volume") about one or more variables (e.g., data points) in the mathematical model.

Figure 9:
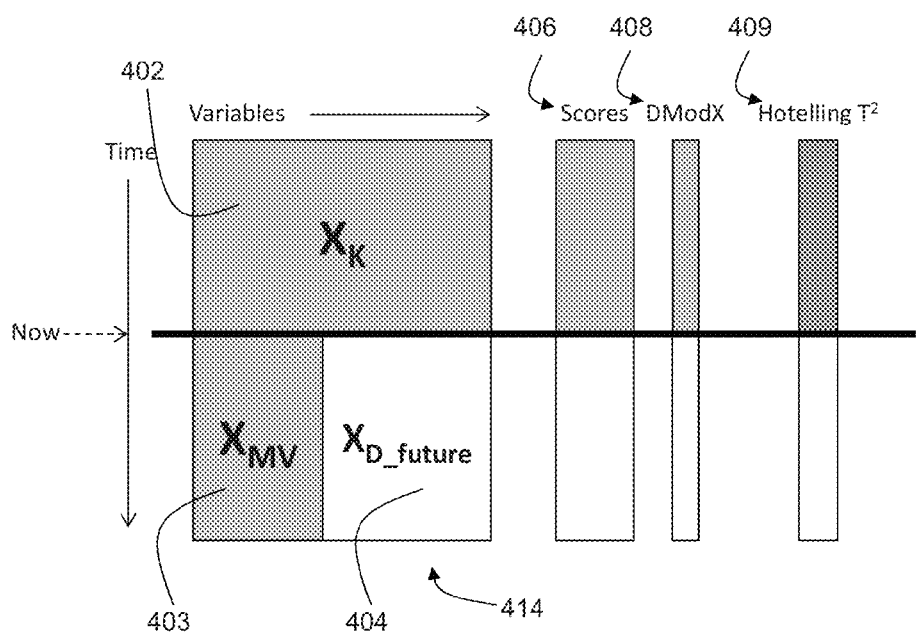
FIG. 9 shows one or more exemplary multivariate metrics generated for monitoring a batch manufacturing process based on another exemplary X-matrix.

FIG. 9 shows one or more exemplary multivariate metrics generated for monitoring a batch manufacturing process based on a completed X-matrix 414. As shown, the X-matrix 414 includes the sub-matrix $X_K$ 402, which can contain measured values of one or more dependent variables and manipulated variables up to the current maturity 412. The X-matrix 414 also includes the sub-matrix $X_{mv}$ 403, which represents the known future setpoint or target values for the manipulated variables of the batch process. The X-matrix 414 further includes the sub-matrix $X_{D\_future}$, which contains predicted future values of the dependent variables using the IBR method 250 of FIG. 4. According to FIG. 9, the multivariate statistics (e.g., the multivariate scores, DModX, $T^2$) are estimated based on a combination of known values $X_{MV}$ (e.g., future values of the manipulated variables), estimated values $X_{D\_future}$ (future values of the dependent variables), and measured values $X_K$ (known past and present values of the manipulated and dependent variables). Specifically, using the X-matrix 414, the analysis component 155 can generate a multivariate scores matrix 406, a DModX matrix 408, and/or a Hotelling $T^2$ matrix 409 to capture the difference over time between actual or predicted batch behavior (represented by the matrix 414) and desired batch behavior (specified by a multivariate model). In some embodiments, the matrices 406, 408 and 409 are more accurate than the corresponding matrices 306, 308 and 309 of FIG. 8, respectively, due to the incorporation of extra information in the sub-matrix $X_{mv}$ 403.

Figure 10:
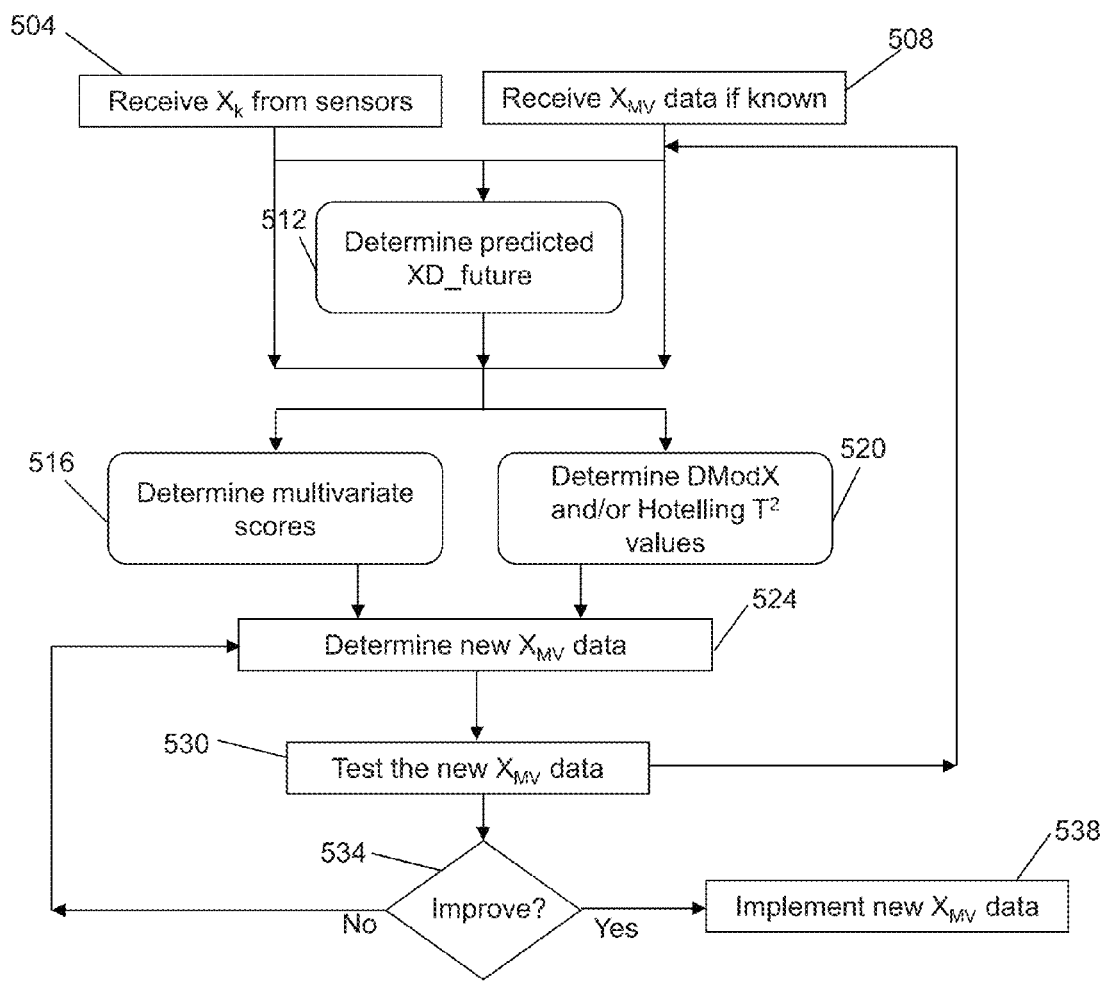
FIG. 10 shows an exemplary method for monitoring the performance a manufacturing process.

FIG. 10 shows an exemplary method for monitoring the performance of a manufacturing process. The method depicted in the flow chart 500 can be implemented by, for example, the monitoring module 135 of FIG. 2 using the monitoring scheme of FIG. 8 or FIG. 9. In step 504, measured values of a set of process variables $X_k$ is received from one or more sensors used in the batch manufacturing process, or from other measuring devices. The process variables can include dependent variables and optionally, manipulated variables. In step 508, future values of the manipulated variables $X_{MV}$ are received, if these values are known. These future values of the manipulated variables can represent setpoint or target values assignable to the manipulated variables at one or more future points in time. From the measured variable data $X_k$ received at step 504 and optionally, future values for the manipulated variables $X_{MV}$, future values of one or more dependent variables $X_{D\_future}$ are computed at step 512. Such computation can be performed by the prediction component 150 of the monitoring module 135 using the IBR method of FIG. 4.

Based on the data sets $X_{D\_future}$ and $X_k$ (and optionally $X_{MV}$), multivariate statistics are determined, including determining multivariate scores at step 516 and/or determining DModX or Hotelling $T^2$ values at step 520. In some embodiments, the multivariate statistics are calculated by a multivariate analytical approach. In general, the multivariate statistics computed at steps 516 and 520 can include Hotelling $T^2$ values, DModX values, principal components scores, partial least squares scores, some combination of these, or all of these statistics. In some embodiments, the statistics are constrained by, for example, user-specified constraints, tolerance levels, or threshold values.

The predicted multivariate scores from step 516, the DModX values and/or the Hotelling $T^2$ values from step 520 indicate whether future batch behavior is likely to deviate from a desired batch trajectory or outside of a tolerance range of the desired batch trajectory. If it is the case, certain operating parameters corresponding to one or more manipulated variables can be adjusted during a batch run to prevent the deviation. In some embodiments, these operating parameters are determined by performing a search for manipulated variable values that satisfy one or more objectives, such as minimizing an amount of deviation in the multivariate scores, DModX values and/or Hotelling $T^2$ values from a desired trajectory. In some embodiments, to achieve the desired batch behavior, the values of one or more manipulated variables are adjusted so as to change the values of one or more dependent variables. As explained above, dependent variables can be a function of manipulated variables such that the value of a particular dependent variable functionally depends on the value of one or more manipulated variables (e.g., $X_D = f(X_{MV})$). The functional relationship can be known or empirically inferred, determined, or modeled. In embodiments in which dependent variables are functionally related to the manipulated variables, a closed-loop process can be used to adjust values of the operating parameters associated with the manipulated variables to more closely approximate the desired values of the dependent variables.

If required, adjustments to the values of one or more manipulated variables are determined at step 524. In some embodiments, the adjustments are represented by a new set of manipulated variable data $X_{MV\_new}$, which specify new setpoint or target values for setting the manipulated variables. These new values can recalibrate or encourage one or more dependent variables to converge to desirable values. At step 530, the proposed adjustments are evaluated to determine whether process performance will improve as a result. To accomplish this, the new manipulated variable data $X_{MV\_new}$ is supplied to the monitoring module 135. Based on a combination of the new manipulated variable data $X_{MV\_new}$, the measured variable values $X_K$, and the future values of dependent variables $X_{D\_future}$, the monitoring module 135 computes another set of multivariate statistics (e.g., multivariate scores, DModX, Hotelling $T^2$) using the approach described above. The new multivariate statistics and/or predicted scores allow an operator to determine the likely effect of the new manipulated variable data $X_{MV\_new}$ on the future behavior of the remaining batch process before any actual implementation takes place.

Therefore, at step 534, if the new manipulated variable data $X_{MV\_new}$ do not enable batch quality to converge to an ideal batch trajectory or to within a tolerance range from the ideal batch trajectory, steps 524 and 530 are repeated so that another set of manipulated variable values $X_{MV\_new}$ can be determined and tested. On the other hand, if the new manipulated variable values $X_{MV}$ are likely to improve batch quality, the new values are implemented at step 538 by, for example, communicating them to one or more process tools. The process tools can be automatically or manually adjusted based on the determined values. Exemplary control actions for adjusting certain operating parameters include, for example, adjusting a recipe based on raw materials (e.g., initial conditions), a mid-process adjustment in response to a variation or change in operating conditions, an update of setpoint values at periodic intervals in the process, or combinations of these.

Figure 11A:
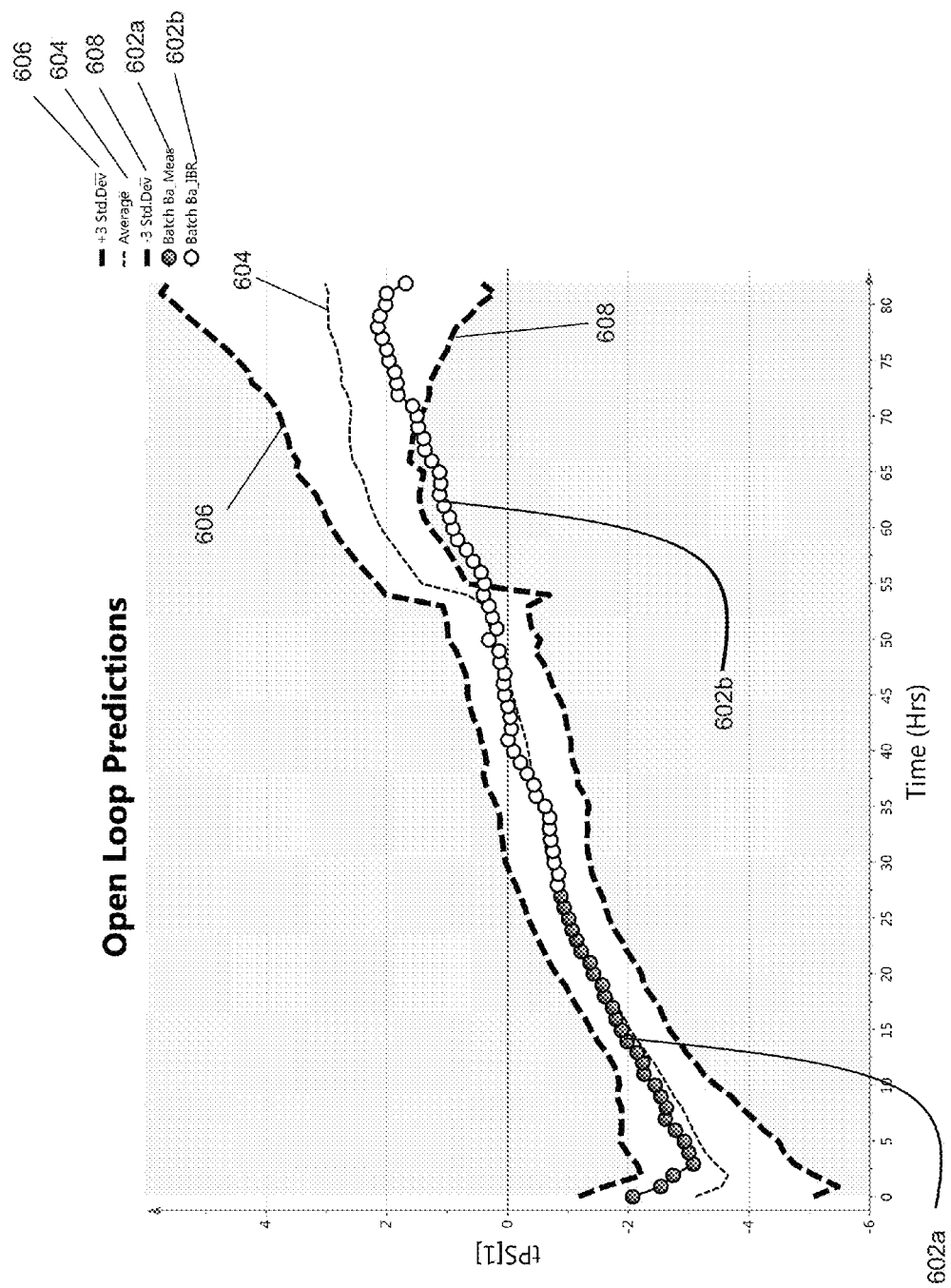
FIGS. 11a and 11b show exemplary trajectories for a batch manufacturing process.
Figure 11B:
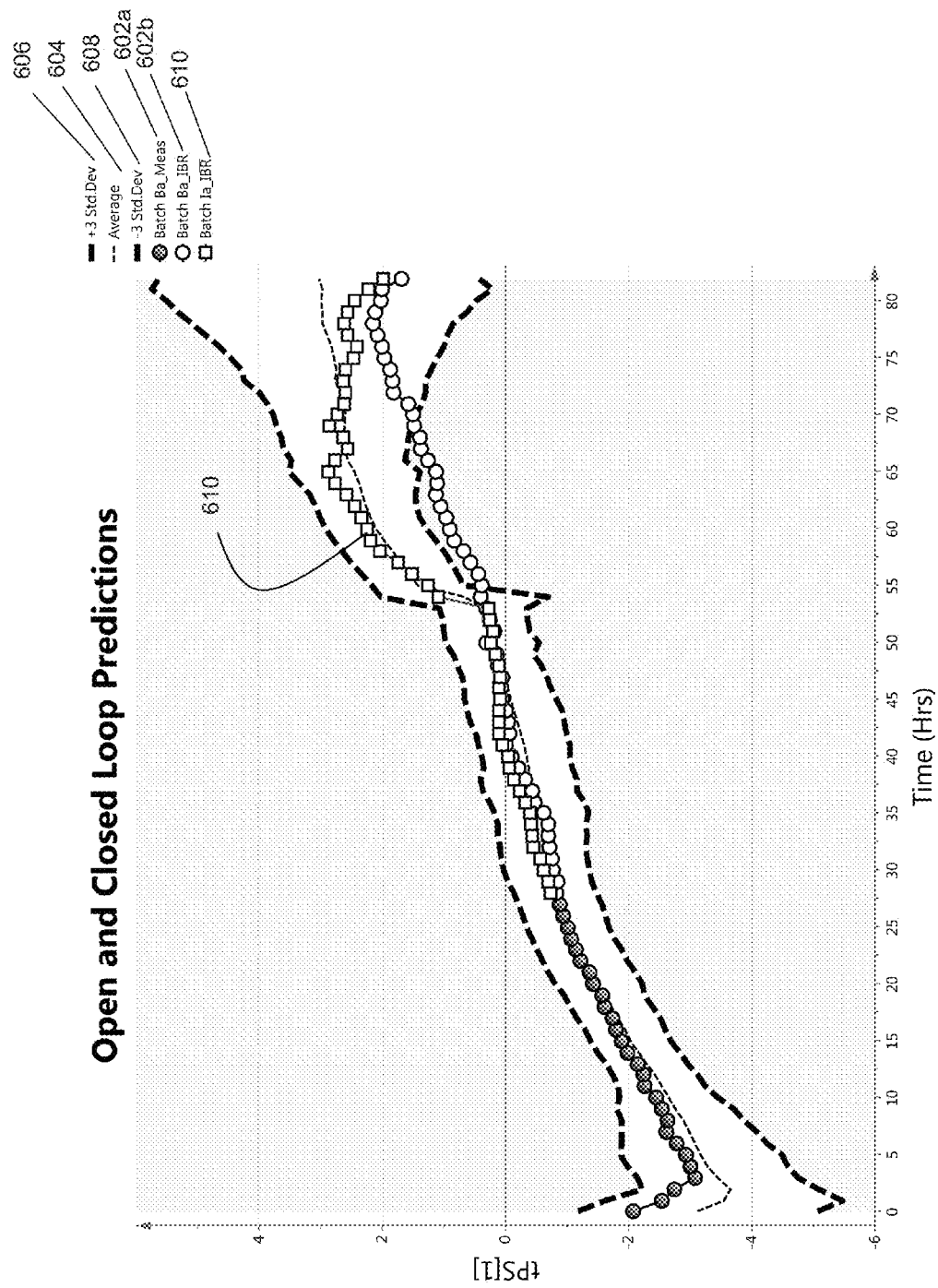

FIGS. 11a and 11b illustrate exemplary trajectories for a batch manufacturing process, which has a finite duration of 82 hours and the trajectories are computed at the maturity point of about 29 hours from the beginning of the process. In FIG. 11a, trajectory 602 captures the behavior of predicted variable values $Y_{pred}$ over the finite duration of the batch process. The predicted variable values $Y_{pred}$ can represent multivariate scores, Hotelling $T^2$ values, or DModX values. The trajectory 602 can be computed based on a combination of measured values of manipulated and dependent variables $X_k$, predicted future values of the dependent variables $X_{D\_future}$ and, optionally, future values of the manipulated variables $X_{MV}$. In some embodiments, the future values of the dependent variables $X_{D\_future}$ is predicted using the IBR method 250. The trajectory 602 can be decomposed into two segments: segment 602a, which shows the past and present $Y_{pred}$ behavior up to the current maturity point, and segment 602b, which shows the predicted future $Y_{pred}$ behavior from the current maturity point to the end of the process. Specifically, segment 602b illustrates the likely effect of past and present batch behavior on the future batch behavior if no adjustments are made to the future manipulated variable values. FIG. 11a also shows an ideal $Y_{pred}$ trajectory 604 for the batch process as well as acceptable deviations 606 and 608 from the ideal trajectory 604. As shown, the predicted trajectory 602b for the batch process is outside of the acceptable deviations 606 and 608, thus indicating that the batch process is likely to deviate from normal behavior and is at risk of producing products with less than expected quality.

In response, an operator can choose to manually or automatically adjust the values of certain operating parameters at the current maturity point to improve batch quality, such as supplying a new set of values for the manipulated variables $X_{MV\_new}$. For example, as shown in FIG. 11b, after selecting a new set of values for the manipulated variables $X_{MV\_new}$, the operator can evaluate the effect of $X_{MV\_new}$ on the remainder of the batch by estimating a new future $Y_{pred}$ trajectory 610 from the maturity point 29 to the end of the batch. The new trajectory 610 is computed from a combination of the hypothesized future values of the manipulated variables $X_{MV\_new}$, the measured values of manipulated and dependent variables $X_k$, and the predicted future values of the dependent variables $X_{D\_future}$, which can be determined using the IBR method 250. As shown in FIG. 11b, the new trajectory 610 is within the acceptable deviations 606 and

608, thus indicating that the new set of manipulated variables $X_{MV\_new}$ can be implemented at various process tools to improve batch quality.

In-process prediction of future values of dependent variables in a batch run, as determined using the IBR method 250 of FIG. 4, are also useful in other applications, such as in biopharmaceutical fermentation and cell culture processes. For example, medium development for a fed-batch process for producing a cell culture (e.g., monoclonal antibody) involves batch medium and feed concentrate development, as well as feeding strategy optimization. Sophisticated optimization of feed composition and feeding strategy often requires consideration of nutrient consumption, by-product accumulation and the balance between promoting growth versus volumetric productivity. In some embodiments, optimization of operating parameters through the use of the IBR method 250 can be used to achieve high expression of product in a cell culture process with acceptable product quality profiles. Exemplary product quality profiles can include desired carbon dioxide level, impurity level, osmolality level, viable cell concentration, cell culture metabolites concentration, and/or pH level in the product. The parameters to be monitored during the culture process, which can be represented as one or more dependent and/or manipulated variables, are physical, chemical and biological in nature. The physical parameters can include temperature, gas flow rate and agitation speed. The chemical parameters can include dissolved oxygen concentration, carbon dioxide concentration, pH level, osmolality, redox potential and metabolite levels (e.g., levels of substrate, amino acid and waste by-products). The biological parameters, which can be used to determine the physiological state of the culture, can include viable cell concentration, viability and a variety of intracellular and extra-cellular measurements (e.g., NADH level, LDH level, mitochondrial activity and cell cycle analysis). In general, one or more of these parameters can be optimized to improve cell culture process performance and understand of how the process affects product quality.

These process variables can be measured either on-line (or at-line by direct connection to calibrated analyzers) or off-line via operator intervention. Typical examples of off-line measurements include pH (usually for verification of on-line pH readings), cell counting and viability measurements using a hemocytometer or automated cell counters, packed cell volume, osmolality and certain metabolite concentrations. Accurate gas and liquid flow measurements can be conducted using mass flow meters and magnetic meters. Temperature can be measured accurately using commercially available resistance temperature devices (RTD), although thermocouples can also be used. Dissolved oxygen can be controlled at a specific setpoint, usually between 20-50% of air saturation. Dissolved CO2 is also an important process variable because it can accumulate to inhibitory levels at values greater than 120-150 mm Hg and affect product quality. Dissolved CO2 can be measured using sensors, off-line blood gas analyzers, and/or on-line mass spectrometry. Many cell culture media are designed to have a certain osmolality level, such as an osmolality in the range 270-330 mOsm/kg. Culture osmolality is a process variable that can be measured using freezing-point depression osmometry. Cell culture metabolites such as glucose, lactate, glutamine and glutamate can be measured off-line using enzymatic biosensors specific to the measured analyte. These measurements are important not only for maintaining substrate levels above critical levels via feeding strategies, but also in developing processes with reduced by-product formation.

Figure 12:
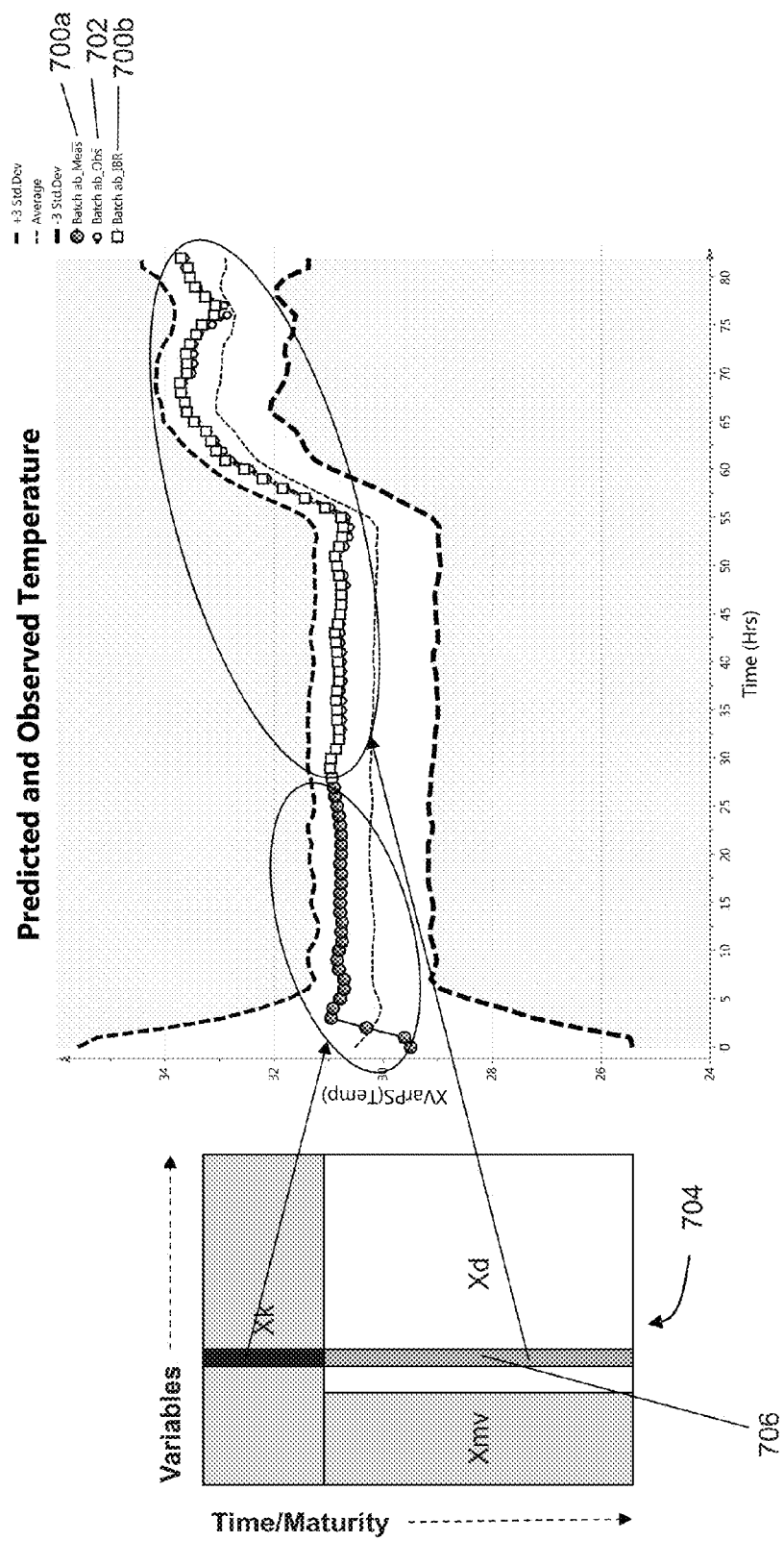
FIG. 12 shows exemplary trajectories of measured and predicted pH levels in a cell culture process.

FIG. 12 shows exemplary trajectories of measured and predicted temperature in a yeast fermentation culture process. The exemplary yeast fermentation culture process has a duration of about 82 hours and the prediction of future temperature behavior is made at the maturity point of about 29 hours from the beginning of the process. The predicted future temperature (subsequent to the $29^{th}$ hour) can be determined using the IBR method 250 of FIG. 4. As shown in FIG. 12, the trajectory 700 captures the behavior of temperature in the yeast culture over the entire duration of the process and can be decomposed into two segments: segment 700*a* represent measured temperature from hours 1-29, and segment 700*b* represents predicted temperature from hours 29-82. As shown, the values in the trajectory 700 map to a column 706 in a corresponding X-matrix 704 constructed using the observation-wise unfolding technique. In other embodiments, a X-matrix (not shown) can be constructed using the batch-wise unfolding technique, from which the trajectory 700 can be extracted. In the X-matrix 704, the column 706 includes data measured and predicted for a dependent variable that represents process temperature. FIG. 12 also shows that the predicted trajectory 700*b* of the temperature variable deviates very little from the temperature measurements taken over the duration of the cell culture process, as represented by the trajectory 702. Specifically, the portion of the trajectory 702 that represents temperatures measured from hours 29-82 show good agreement with the segment 700*b*, which represents predicted temperature values from hours 29-82.

Figure 13A:
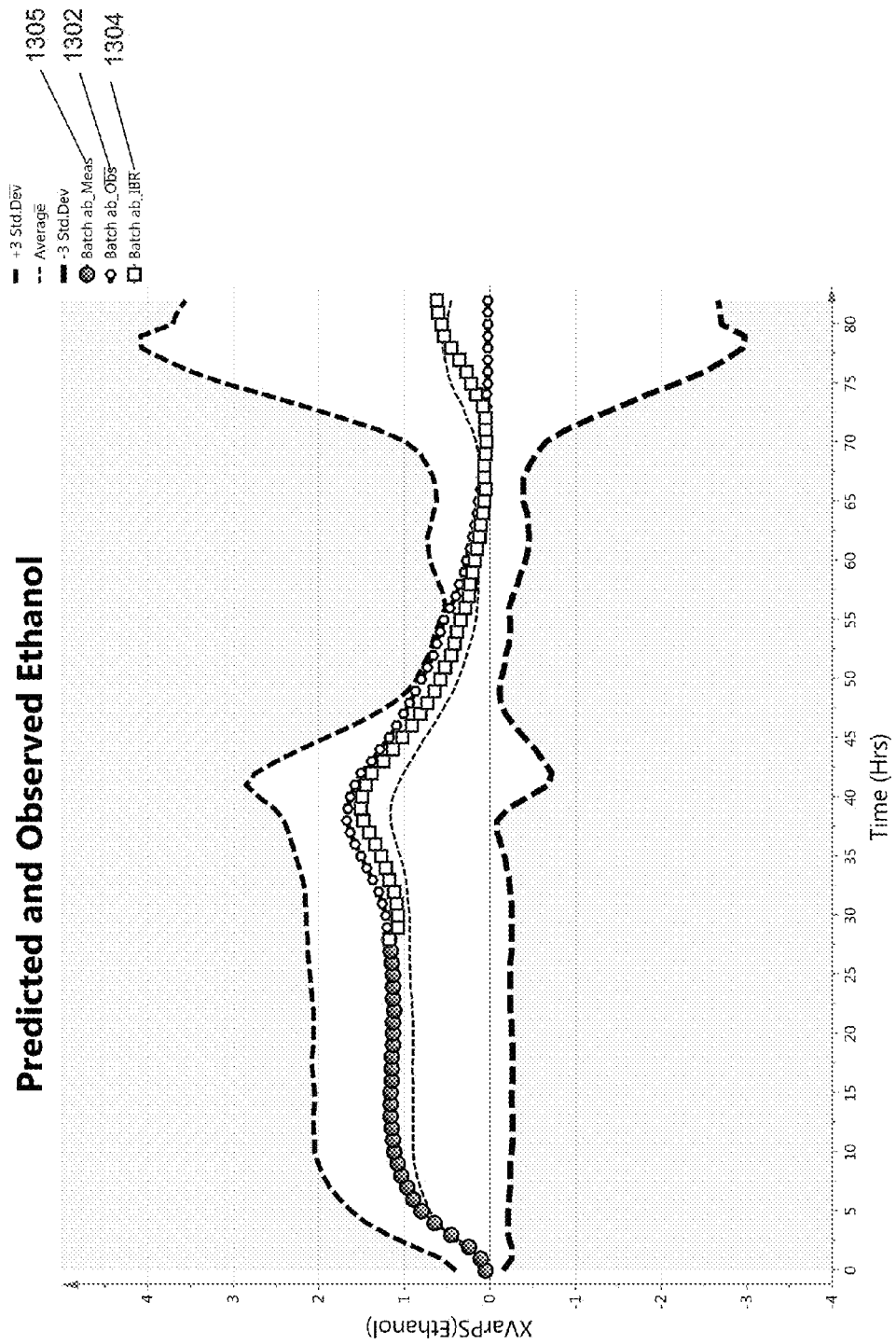
FIGS. 13a-13c show exemplary trajectories of measured and predicted values of several process variables in a cell culture process.
Figure 13B:
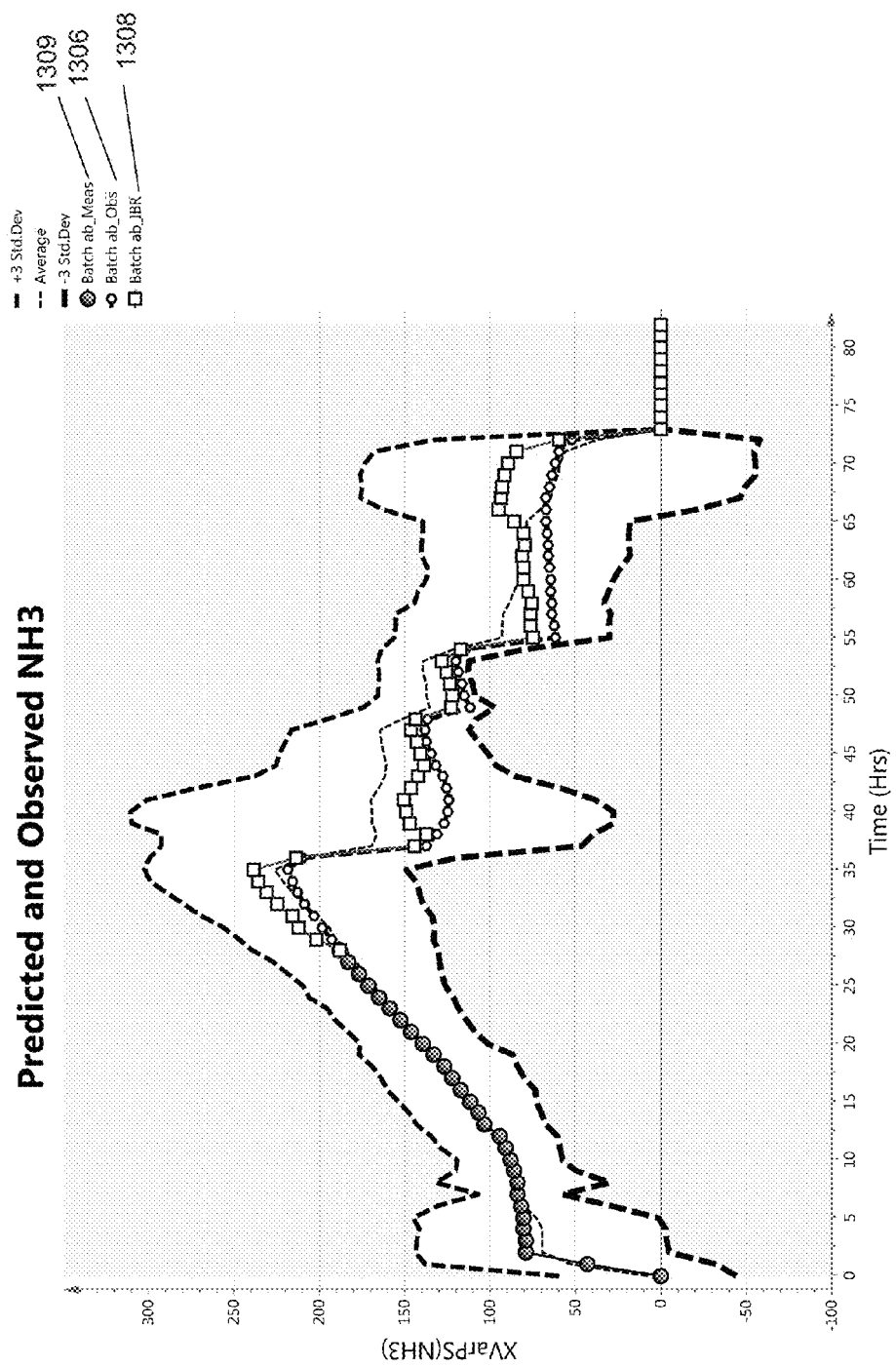
Figure 13C:
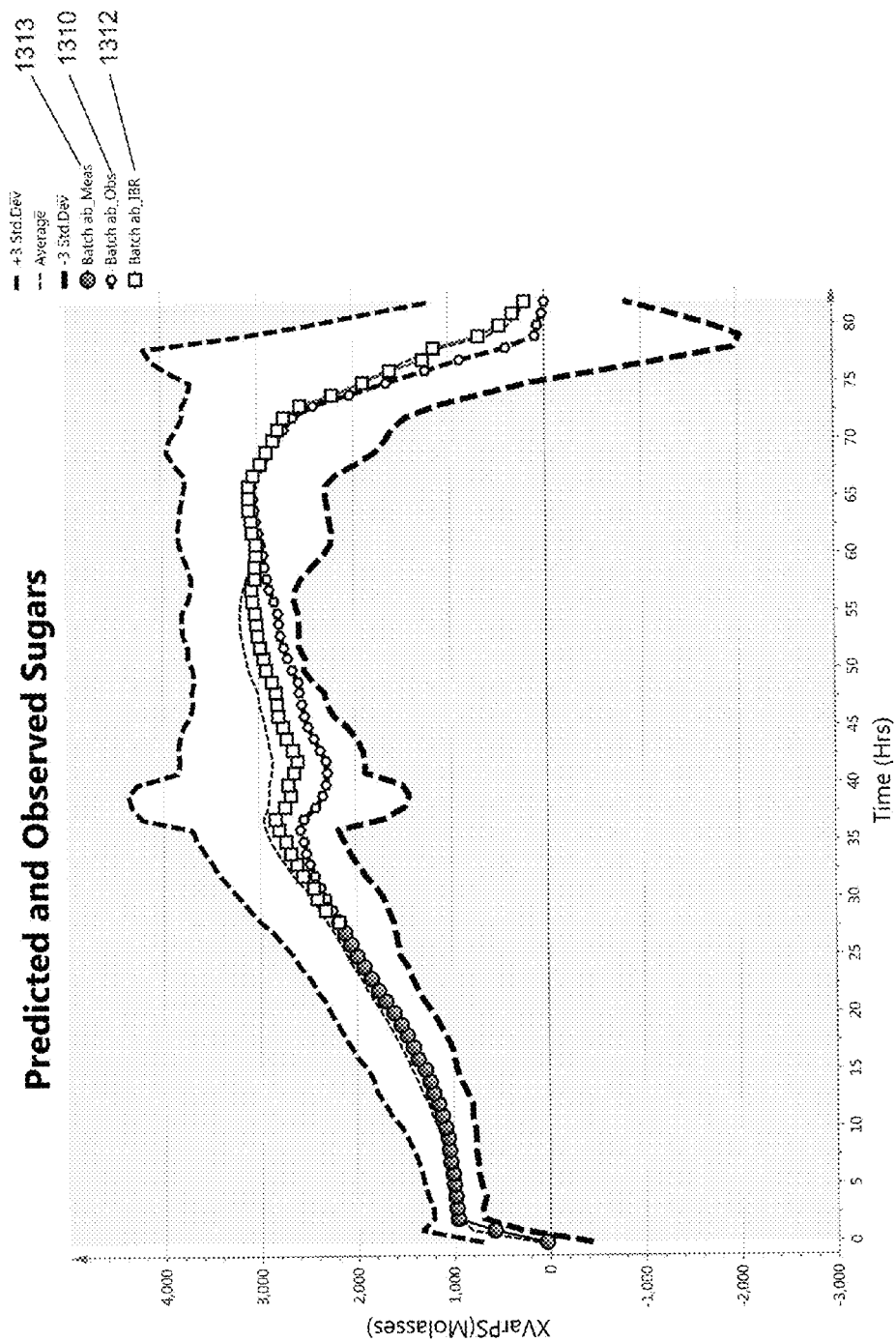

FIGS. 13*a-c* show exemplary trajectories of measured and predicted values of several additional process variables in a yeast fermentation culture process, similar to the process of FIG. 12, where prediction is made from hour 29 to the end of the process at hour 82 using the IBR method 250 of FIG. 4. FIG. 13*a* shows a comparison of measured trajectory 1302 and predicted trajectory 1304 for ethanol concentration from hours 29 to 82 in the batch process. The trajectory 1305 plots the measured values of ethanol concentration up to the maturity point (hour 27), based on which the future trajectory of ethanol concentration 1304 is determined using the IBR method 250. FIG. 13*b* shows a comparison of measured trajectory 1306 and predicted trajectory 1308 for $NH_3$ concentration from hours 29 to 82 in the batch process. In addition, the trajectory 1309 plots the measured values of $NH_3$ concentration up to the maturity point, based on which the future trajectory of $NH_3$ concentration 1308 is determined using the IBR method 250. FIG. 13*c* shows a comparison of measured trajectory 1310 and predicted trajectory 1312 for sugar concentration from hours 27 to 82 in the batch process. In addition, the trajectory 1313 plots the measured values of sugar concentration up to the maturity hour of 27, based on which the future trajectory of sugar concentration 1312 is determined using the IBR method 250. FIGS. 13*a-c* illustrate that good agreements between the measure and predicted values of various process variables can be achieved using the IBR method 250.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

While the invention has been particularly shown and described with reference to specific embodiments, it should be understood by those skilled in the art that various changes in form and detail may be made therein without departing from the spirit and scope of the invention as defined by the appended claims.

The invention claimed is:

1. A computer-implemented method for predicting prospective behavior of a batch-type manufacturing process with a finite duration, the method comprising:
   receiving, by a computing device, measured values of a plurality of variables of the manufacturing process, including (i) measured values of the plurality of variables associated with at least one historical batch run and (ii) measured values of the plurality of variables associated with at least one current batch run representative of values measured up to a current maturity point in time, wherein the plurality of variables comprise at least one dependent variable that represents a process parameter whose value is dependent on one more process conditions; and using, by the computing device, a partial least squares (PLS) regression approach to estimate an unknown future value of the at least one dependent variable at a future point in time in the at least one current batch run, wherein using the PLS regression approach comprises:

creating, by the computing device, a X matrix including the measured values of the plurality of variables associated with the at least one historical batch run;

creating, by the computing device, a Y matrix including the measured values of the at least one dependent variable associated with the at least one historical batch run;

applying, by the computing device, the PLS regression approach to determine a relationship between the X matrix and the Y matrix, wherein the relationship is represented by a $\beta$ matrix; and using, by the computing device, the $\beta$ matrix and the measured values of the plurality of variables for the at least one current batch run to estimate the unknown future value of the at least one dependent variable for the at least one current batch run; and using, the $\beta$ matrix to predict a plurality of future values of the at least one dependent variable at a plurality of future points in time after the current maturity point to the end of the finite duration of the at least one current batch run.

2. The computer-implemented method of claim 1, wherein the at least one dependent variable is not directly assignable during the manufacturing process.

3. The computer-implemented method of claim 1, wherein the plurality of variables of the manufacturing process further include at least one manipulated variable that represents a process parameter whose value is assignable during the manufacturing process.

4. The computer-implemented method of claim 3, further comprising:

receiving at least one future value of the at least one manipulated variable associated with the at least one current batch run; and using (1) the relationship represented by the $\beta$ matrix, (2) the measured values of the plurality of variables for the at least one current batch run, and (3) the at least one future value of the at least one manipulated variable associated with the at least one current batch run to estimate the unknown future value of the at least one dependent variable for the at least one current batch.

5. The computer-implemented method of claim 4, wherein the at least one future value of the at least one manipulated variable represents a known value for setting the at least one manipulated variable at a future point in time in the at least one current batch run.

6. The computer-implemented method of claim 1, further comprising running the PLS regression approach once without iteration to determine the $\beta$ matrix.

7. The computer-implemented method of claim 1, wherein the measured values of the at least one dependent variable associated with the at least one historical batch run appears in both the X matrix and the Y matrix.

8. The computer-implemented method of claim 1, further comprising performing multivariate analysis on a combination of (1) the measured values of the plurality of variables and (2) the estimated future value of the at least one dependent variable to generate a plurality of multivariate statistics for the at least one current batch run.

9. The computer-implemented method of claim 8, wherein the plurality of multivariate statistics represent a trajectory of at least one of past, current or estimated future behavior of the manufacturing process.

10. The computer-implemented method of claim 1, wherein the manufacturing process comprises growing a cell culture medium to achieve one or more quality profiles for the cell culture medium.

11. The computer-implemented method of claim 10, wherein the plurality of variables of the manufacturing process comprise a plurality of physical, chemical and biological parameters and wherein the PLS regression approach is used to estimate an unknown future value of at least one dependent variable from the plurality of physical, chemical and biological parameters to achieve the one or more quality profiles.

12. The computer-implemented method of claim 11, wherein the physical parameters include at least one of temperature, gas flow rate or agitation speed.

13. The computer-implemented method of claim 11, wherein the chemical parameters include at least one of dissolved oxygen concentration, carbon dioxide concentration, pH concentration, osmolality, redox potential, metabolite level, amino acid concentration or waste by-products production.

14. The computer-implemented method of claim 11, wherein the biological parameters include at least one of viable cell concentration, intra-cellular measurements or extra-cellular measurements.

15. The computer implemented method of claim 10, wherein the one or more quality profiles comprise a carbon dioxide profile, impurity profile, osmolality profile, viable cell concentration profile, and pH profile.

16. A prediction system for a batch-type manufacturing process associated with a finite duration, the prediction system comprising:

one or more sensors for measuring values of a plurality of variables of the manufacturing process including at least one dependent variable that represents a process parameter whose value is dependent on one more process conditions, wherein the measure values include measured values of the plurality of variables associated with at least one historical batch run and measured values of the plurality of variables associated with at least one current batch run; and a prediction module for estimating an unknown future value of the at least one dependent variable at a future point in time in the at least one current batch run using a partial least squares (PLS) regression approach, the prediction module including:

a calibration component that is configured to generate (1) a X matrix including the measured values of the plurality of variables associated with the at least one historical batch run; (2) a Y matrix including the measured value of the at least one dependent variable associated with the at least one historical batch run; and (3) a relationship between the X matrix and the Y matrix determined based on the PLS regression approach, wherein the relationship is represented by a $\beta$ matrix; and an estimation component that is configured to estimate the unknown future value of the at least one dependent variable in the at least one current batch run using the β matrix and the measured values of the plurality of variables associated with the at least one current batch run.

17. The prediction system of claim 16, wherein the plurality of variables of the manufacturing process further include at least one manipulated variable that represents a process parameter whose value is assignable during the manufacturing process.

18. The prediction system of claim 17, further comprising an input module for receiving at least one future value of the at least one manipulated variable associated with the at least one current batch run, wherein the estimation component of the prediction module is configured to estimate the unknown future value of the at least one dependent variable using (1) the relationship represented by the β matrix, (2) the measured values of the plurality of variables associated with the at least one current batch run, and (3) the at least one future value of the at least one manipulated variable associated with the at least one current batch run.

19. The prediction system of claim 16, further comprising an analysis module for performing multivariate analysis on a combination of (1) the measured values of the plurality of variables and (2) the estimated future value of the at least one dependent variable to generate a plurality of multivariate statistics for the at least one current batch run.

20. The prediction system of claim 16, wherein the prediction module is configured to run the PLS regression approach once without iteration to determine the β matrix.

\* \* \* \* \*